(12) United States Patent
Del Pino Ruiz et al.

(10) Patent No.: US 12,020,074 B2
(45) Date of Patent: *Jun. 25, 2024

(54) DYNAMIC ALLOCATION OF RESOURCES IN SURGE DEMAND

(71) Applicant: Optum Services (Ireland) Limited, Dublin (IE)

(72) Inventors: Vicente Ruben Del Pino Ruiz, Dublin (IE); Hendrik Kleine, Dublin (IE)

(73) Assignee: Optum Services (Ireland) Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,020

(22) Filed: Apr. 3, 2023

(65) Prior Publication Data
US 2023/0236894 A1    Jul. 27, 2023

Related U.S. Application Data

(63) Continuation of application No. 17/150,203, filed on Jan. 15, 2021, now Pat. No. 11,645,119.
(Continued)

(51) Int. Cl.
*G06F 9/50* (2006.01)

(52) U.S. Cl.
CPC ............ *G06F 9/5038* (2013.01); *G06F 9/505* (2013.01); *G06F 9/5077* (2013.01); *G06F 2209/5019* (2013.01); *G06F 2209/5021* (2013.01)

(58) Field of Classification Search
CPC ...... G06F 9/5038; G06F 9/505; G06F 9/5077; G06F 2209/5019; G06F 2209/5021; G06Q 10/0631; G06Q 50/00; G06Q 10/04
See application file for complete search history.

(56) References Cited

U.S. PATENT DOCUMENTS

| | | | |
|---|---|---|---|
| 8,069,057 B2 | 11/2011 | Choubey et al. | |
| 8,190,448 B2 | 5/2012 | Bajars et al. | |

(Continued)

FOREIGN PATENT DOCUMENTS

| | | |
|---|---|---|
| WO | 2012/102782 A1 | 8/2012 |
| WO | 2019/182590 A1 | 9/2019 |
| WO | 2019/222738 A1 | 11/2019 |

OTHER PUBLICATIONS

Fang, Jiaqi et al. "Dynamic Planning Method for Drug Distribution in Earthquake Response Based on Sliding Time Window Series," IEEE Access, vol. 9, Sep. 1, 2020, pp. 160697-160710. DOI: 10.1109/Access.2020.3020829.

(Continued)

*Primary Examiner* — Sisley N Kim
(74) *Attorney, Agent, or Firm* — Alston & Bird LLP

(57) ABSTRACT

Embodiments of the present disclosure provide methods, apparatus, systems, computing devices, computing entities, and/or the like for the generation of a recommendation for one or more resource transformation actions to be performed based at least in part on an optimized resource transformation scenario. The optimized resource transformation scenario can be identified based at least in part on a hybrid resource transformation scenario that can be based at least in part on a resource priority score for a residual resource and a downgrade-only resource transformation scenario. The downgrade set of a plurality of resources can be determined based at least in part on resource transformation data associated with the plurality of resources.

20 Claims, 11 Drawing Sheets

Related U.S. Application Data

(60) Provisional application No. 63/057,385, filed on Jul. 28, 2020.

(56) References Cited

U.S. PATENT DOCUMENTS

| | | | |
|---|---|---|---|
| 8,515,777 | B1 | 8/2013 | Rajasenan |
| 9,536,052 | B2 | 1/2017 | Amarasingham et al. |
| 9,923,785 | B1* | 3/2018 | Li .......................... H04L 41/40 |
| 10,715,665 | B1* | 7/2020 | Smith ..................... G06N 20/00 |
| 11,095,520 | B1 | 8/2021 | Bhat et al. |
| 11,861,386 | B1* | 1/2024 | Varun Mukesh ....... G06F 9/547 |
| 2006/0009992 | A1 | 1/2006 | Cwiek et al. |
| 2007/0203727 | A1 | 8/2007 | Moore |
| 2009/0046837 | A1 | 2/2009 | Thiel |
| 2009/0326978 | A1 | 12/2009 | Fultz et al. |
| 2017/0024523 | A1 | 1/2017 | Gutfraind et al. |
| 2019/0206549 | A1 | 7/2019 | Perry et al. |
| 2019/0340265 | A1 | 11/2019 | Raman et al. |
| 2021/0081970 | A1* | 3/2021 | Fama ................ G06Q 10/06393 |
| 2022/0035677 | A1 | 2/2022 | Del Pino Ruiz et al. |

OTHER PUBLICATIONS

International Searching Authority, International Search Report and Written Opinion for International Application No. PCT/US2021/043285, dated Dec. 8, 2021, (17 pages), European Patent Office, Rijswijk, Netherlands.

Kaji, Amy et al. "Surge Capacity for Healthcare Systems: A Conceptual Framework," The Society for Academic Emergency Medicine, vol. 13, No. 11, Nov. 2006, pp. 1157-1159. DOI: 10.1197/j.aem.2006.06.032. ISSN: 1069-6563. PII ISSN: 1069-6563583.

Tariverdi, Mersedeh et al. "A Resource-Constrained, Multi-Unit Hospital Model for Operational Strategies Evaluation Under Routine and Surge Demand Scenarios," IISE Transactions on Healthcare Systems Engineering, vol. 9, No. 2, Mar. 2019, (32 pages). ePublished: Apr. 17, 2019. DOI: 10.1080/24725579.2019.1524132.

* cited by examiner

Recommended Transformations:

Transform hospital beds B1, B3, B4, B6, B12, and B15 to ventilator-equipped beds Train employee numbers E32535 and E42353 to ICU nurses.

Estimated Transformation Cost: $123,321
Estimated Transformation Time: 123 Days

Additional Links:
- Compare this transformation scenario with other transformation scenarios
- Change resource transformation optimization parameters
- See transformation update for this transformation scenario

FIG. 11

DYNAMIC ALLOCATION OF RESOURCES IN SURGE DEMAND

CROSS-REFERENCE TO RELATED APPLICATIONS

This application claims the benefit of U.S. patent application Ser. No. 17/150,203, filed Jan. 15, 2021, which is incorporated herein by reference in its entirety, including any figures, tables, and drawings. U.S. patent application Ser. No. 17/150,203 claimed the benefit of U.S. Provisional Patent Application Ser. No. 63/057,385, filed Jul. 28, 2020, which was incorporated therein by reference in its entirety, including any figures, tables, and drawings.

TECHNOLOGICAL FIELD

Embodiments of the present disclosure generally relate to systems and methods for systematically and proactively recommending and executing the transformation of resources to satisfy resource demand conditions resulting from specific resource demand surge scenarios.

BACKGROUND

A need exists in the industry to address technical challenges related to systematically and proactively recommending transformation of resources to satisfy resource demand conditions resulting from specific resource demand surge scenarios. The disclosed techniques can be used in executing automated actions to transform resources in an efficient and cost effective manner to meet demand surge scenarios. It is with respect to these considerations and others that the disclosure herein is presented.

BRIEF SUMMARY

In general, embodiments of the present disclosure provide methods, apparatus, systems, computing devices, computing entities, and/or the like for optimized resource transformation given a set of resource optimization parameters. In accordance with one aspect of the disclosure, a method for optimized resource transformation given a set of resource optimization parameters is provided. In various embodiments, the method includes: identifying a demand surge scenario, wherein the demand surge scenario is associated with one or more resource demand conditions; in response to identifying the demand surge scenario: determining, based at least in part on a plurality of resource transformation data objects associated with a plurality of resources, a downgrade set of the plurality of resources; determining whether a downgrade-only resource transformation scenario characterized by downgrade transformation of the downgrade set of the plurality of resources satisfies the one or more resource demand conditions; in response to determining that the downgrade-only resource transformation scenario satisfies the one or more resource demand conditions, generating an optimized resource transformation scenario based at least in part on the downgrade-only resource transformation scenario; and in response to determining that the downgrade-only resource transformation scenario fails to satisfy the one or more resource demand conditions: (i) identifying one or more residual resources of the plurality of resources that are deemed transformable to meet the one or more resource demand conditions but are not in the downgrade set, (ii) processing the one or more residual resources using a resource optimization machine learning model that is characterized by the set of resource optimization parameters to generate one or more resource priority scores for the one or more residual resources, (iii) generating a hybrid resource transformation scenario based at least in part on the one or more resource priority scores and the downgrade-only resource transformation scenario, and (iv) generating the optimized resource transformation scenario based at least in part on the hybrid resource transformation scenario; and causing one or more resource transformation actions to be performed based at least in part on the optimized resource transformation scenario.

In accordance with another aspect of the present disclosure, an apparatus is provided. In various embodiments, the apparatus includes at least one processor and at least one memory including program code. The at least one memory and the program code are configured to, with the at least one processor, cause the apparatus to at least: identify a demand surge scenario, wherein the demand surge scenario is associated with one or more resource demand conditions; in response to identifying the demand surge scenario: determine, based at least in part on a plurality of resource transformation data objects associated with a plurality of resources, a downgrade set of the plurality of resources; determine whether a downgrade-only resource transformation scenario characterized by downgrade transformation of the downgrade set of the plurality of resources satisfies the one or more resource demand conditions; in response to determining that the downgrade-only resource transformation scenario satisfies the one or more resource demand conditions, generate an optimized resource transformation scenario based at least in part on the downgrade-only resource transformation scenario; and in response to determining that the downgrade-only resource transformation scenario fails to satisfy the one or more resource demand conditions: (i) identify one or more residual resources of the plurality of resources that are deemed transformable to meet the one or more resource demand conditions but are not in the downgrade set, (ii) process the one or more residual resources using a resource optimization machine learning model that is characterized by the set of resource optimization parameters to generate one or more resource priority scores for the one or more residual resources, (iii) generate a hybrid resource transformation scenario based at least in part on the one or more resource priority scores and the downgrade-only resource transformation scenario, and (iv) generate the optimized resource transformation scenario based at least in part on the hybrid resource transformation scenario; and cause one or more resource transformation actions to be performed based at least in part on the optimized resource transformation scenario.

In accordance with yet another aspect of the present disclosure, a computer program product is provided. In particular embodiments, the computer program product includes a non-transitory computer storage medium having instructions stored therein. The instructions being configured to cause one or more computer processors to at least perform operations configured to: identify a demand surge scenario, wherein the demand surge scenario is associated with one or more resource demand conditions; in response to identifying the demand surge scenario: determine, based at least in part on a plurality of resource transformation data objects associated with a plurality of resources, a downgrade set of the plurality of resources; determine whether a downgrade-only resource transformation scenario characterized by downgrade transformation of the downgrade set of the plurality of resources satisfies the one or more resource demand conditions; in response to determining that the downgrade-only resource transformation scenario satisfies the one or more resource demand conditions, generate an optimized resource transformation scenario based at least in part on the downgrade-only resource transformation scenario; and in response to determining that the downgrade-only resource transformation scenario fails to satisfy the one or more resource demand conditions: (i) identify one or more residual resources of the plurality of resources that are deemed transformable to meet the one or more resource demand conditions but are not in the downgrade set, (ii) process the one or more residual resources using a resource optimization machine learning model that is characterized by the set of resource optimization parameters to generate one or more resource priority scores for the one or more residual resources, (iii) generate a hybrid resource transformation scenario based at least in part on the one or more resource priority scores and the downgrade-only resource transformation scenario, and (iv) generate the optimized resource transformation scenario based at least in part on the hybrid resource transformation scenario; and cause one or more resource transformation actions to be performed based at least in part on the optimized resource transformation scenario.

In particular embodiments, each resource transformation data object for a resource of the plurality of resources that is either in the downgrade set or among the one or more residual resources indicates that the resource has a capability to be transformed to satisfy the one or more resource demand conditions within an expected time occurrence for the demand surge scenario. In addition, in particular embodiments, identifying the demand surge scenario involves: generating, using a trend surge prediction machine learning model, a trend surge indicator based at least in part on a recent trend for one or more resource demand indicators associated with the one or more resource demand conditions; generating, using a historical surge prediction machine learning model, a historical surge indicator based at least in part on a cyclical trend for the one or more resource demand indicators; generating a surge score based at least in part on the trend surge indicator and the historical surge indicator; and identifying the demand surge scenario based at least in part on whether the surge score satisfies a surge score threshold. In other embodiments, identifying the demand surge scenario involves: identifying a first demand surge scenario associated with one or more first resource demand conditions; identifying a second demand surge scenario associated with one or more second resource demand conditions; determining the one or more resource demand conditions based at least in part on the one or more first resource demand conditions and the one or more second resource demand conditions; and determining the demand surge scenario based at least in part on the one or more resource demand conditions.

In some embodiments, the one or more resource demand conditions are based at least in part on merging the one or more first resource demand conditions and the one or more second resource demand conditions to generate the one or more resource demand conditions. In other embodiments, the one or more resource demand conditions are based at least in part on a shared subset of the one or more first resource demand conditions and the one or more second resource demand conditions. Yet, in other embodiments, the one or more resource demand conditions are based at least in part on: determining a first demand surge priority score for the first demand surge scenario; determining a second demand surge priority score for the second demand surge scenario; in response to determining that the first demand surge priority score exceeds the second demand surge priority score, determining the one or more resource demand conditions based at least in part on the one or more first resource demand conditions; and in response to determining that the second demand surge priority score exceeds the first demand surge priority score, determining the one or more resource demand conditions based at least in part on the one or more second resource demand conditions.

Furthermore, in some embodiments, each resource transformation data object for a resource of the plurality of resources that is in the downgrade set describes that the resource can be transformed to satisfy at least one of the one or more resource demand conditions for at least one of no cost or a cost satisfying a threshold cost. In addition, in some embodiments, the set of resource optimization parameters comprises at least one of a transformation cost parameter or a transformation time parameter. Finally, in some embodiments, the one or more resource transformation actions comprise automatically executing one or more operations to have one or more resources identified in the optimized resource transformation scenario transformed to satisfy the one or more resource demand conditions.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 9:
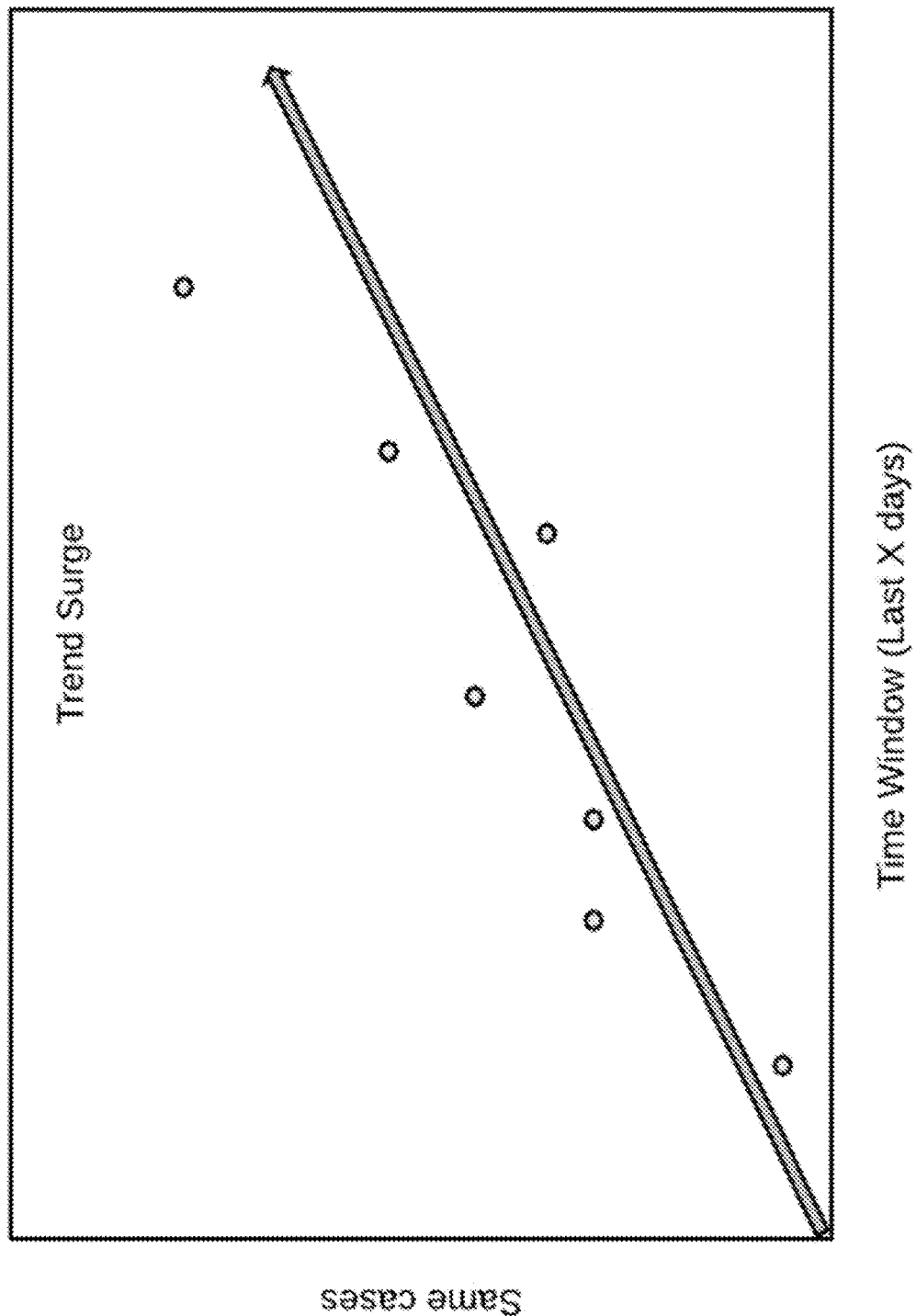
Figure 10:
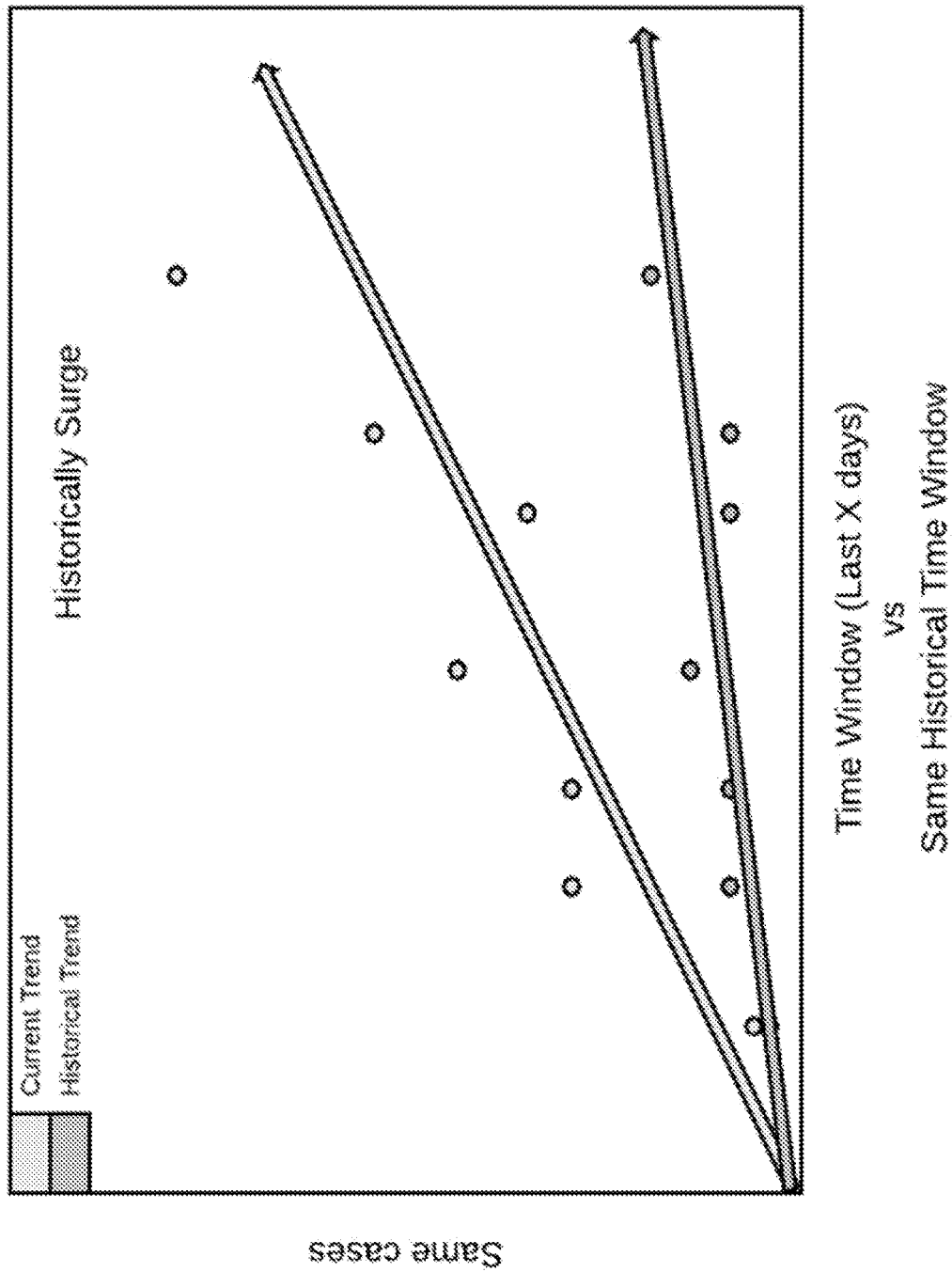

FIG. 9 provides an operational example of recent trend generation in accordance with various embodiments of the present disclosure; and FIG. 10 provides an operational example of historical trend generation in accordance with various embodiments of the present disclosure; and FIG. 11 provides an operational example of a prediction output user interface in accordance with various embodiments of the present disclosure.

DETAILED DESCRIPTION OF SOME EXAMPLE EMBODIMENTS

Various embodiments of the present disclosure now will be described more fully hereinafter with reference to the accompanying drawings, in which some, but not all embodiments of the disclosure are shown. Indeed, the disclosure may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

Definitions of Certain Terms

The term "demand surge scenario" may refer to a data object that describes one or more events leading to one or more resource demand conditions. Resource demand conditions may be conditions requiring one or more resources to address a need deriving from the demand surge scenario. Oftentimes, events involved in demand surge scenarios are unforeseen by responsible person. For example, in the healthcare industry, a demand surge scenario may represent the occurrence of an event such as an epidemic, a medical emergency affecting multiple persons such as a multiple car crash incident, or other event that results in a markedly increase in volume of patients who are in need of some type of medical service requiring one or more resources such as physicians, nurses, specific medications, hospital beds, and/or the like. In another example, a demand surge scenario may be seen in an industry manufacturing a particular product when occurrence of an event takes place that results in a resource demand condition based at least in part on consumer demand for the product markedly exceeding normal demand. For instance, a demand surge scenario may be a natural disaster such as a hurricane that may result in a resource demand condition based at least in part on a markedly increase in demand for power generators requiring the need of raw material resources to manufacturer the power generators. Thus, a demand surge scenario often results in one or more resource demand conditions that need to be satisfied to adequately address the demand surge scenario.

The term "trend surge prediction machine learning model" may refer to a data object that describes parameters and/or hyper-parameters (e.g., defined operations) of a model configured to predict a current trend for the development of a demand surge scenario that may lead to one or more resource demand conditions. For example, the demand surge scenario may involve a surge in demand for a service and/or product that results in one or more resource demand conditions that need to be satisfied to address the demand surge scenario for the service and/or product. In various embodiments, the trend surge prediction machine learning model may be configured to generate a trend surge indicator representing the current trend for the development of the demand surge scenario based at least in part on a recent trend for one or more resource demand indicators associated with the one or more resource demand conditions. For example, for a healthcare facility, the one or more resource demand indicators may include patient intake data such as data describing the number of patients who are admitted into the healthcare facility, demographics of the patients, underlying medical conditions of the patients, chronic medical conditions of the patients, severity of the conditions of the patients, date and time of intake of the patients, specialties required by the patients, and/or the like. Depending on the embodiment, the trend surge prediction machine learning model may be configured as any number of different types of models in predicting the current trend in developing the demand surge scenario such as, for example, a combination of one or more of exponential moving average models, auto regression models, linear regression models, polynomial regression models, autoregressive-moving-average models, seasonal autoregressive-moving-average models, autoregressive-integrated-moving-average models, recurrent neural network models, and/or the like.

The term "historical surge prediction machine learning model" may refer to a data object that describes parameters and/or hyper-parameters (e.g., defined operations) of a model configured to predict a historical trend for the development of a demand surge scenario that may lead to one or more resource demand conditions. In various embodiments, the historical surge prediction machine learning model may be configured to generate a historical surge indicator representing the historical trend for the development of the demand surge scenario based at least in part on a cyclical trend for one or more resource demand indicators associated with the one or more resource demand conditions. Similar to the trend surge prediction machine learning model, depending on the embodiment, the historical surge prediction machine learning model may be configured as any number of different types of models in predicting the historical trend for developing the demand surge scenario such as, for example, a combination of one or more of exponential moving average models, auto regression models, linear regression models, polynomial regression models, autoregressive-moving-average models, seasonal autoregressive-moving-average models, autoregressive-integrated-moving-average models, recurrent neural network models, and/or the like.

The term "surge score" may refer to a data object representing a value determined to represent a final measure of a trend in developing a demand surge scenario that takes into account both the trend surge indicator and the historical surge indicator. For instance, in particular embodiments, the surge score is generated as the trend surge indicator plus the historical surge indicator, divided by the sum of the two. Accordingly, in various embodiments, the demand surge scenario may be identified based at least in part on the surge score satisfying a surge threshold.

The term "resource transformation data object" may refer to a data object representing a resource used in addressing a resource demand condition. For example, a resource may be some type of material or nonmaterial drawn upon to address a resource demand condition such as a manufacturing raw material, component, equipment, supply, personnel, facility, and/or the like. In various embodiments, the resource transformation data object may represent a resource that is required to go through some type of transformation to be able to be used to satisfy the resource demand condition. For example, the resource may be a healthcare professional working for a healthcare facility who is trained in treating respiratory disorders. In this example, to deploy this professional to perform surgeries and/or treatment for disorders other than respiratory disorders, the professional may be required to undertake some type of transformation such as additional training. Accordingly, in various embodiments, one or more transformation parameters may be associated with a resource transformation data object for a resource that are related to transforming the resource to have the capacity to satisfy a demand condition such as, for example, transformation cost, transformation time, and/or the like. In addition, in some embodiments, other types of data may be associated with a resource transformation data object for a resource such as, for example, what resource demand conditions the resource may address through transformation, and whether the resource requires a downgrade transformation or an upgrade transformation to meet those other resource demand conditions. In particular embodiments, a downgrade transformation involves transforming the resource to satisfy a resource demand condition at no cost or at a cost satisfying (e.g., equal to or below) a threshold cost. While an upgrade transformation involves transforming the resource to satisfy the resource demand condition at a cost or at a cost not satisfying (e.g., above) the threshold cost.

The term "optimized resource transformation scenario" may refer to a data object providing a set of resource transformation data objects representing resources that can be transformed to meet one or more resource demand conditions that are the result of a demand surge scenario. In particular embodiments, the set of resource transformation data objects identified by the optimized resource transformation scenario may be optimized with respect to the use of the corresponding resources in addressing the one or more resource demand conditions. Accordingly, in these embodiments, such optimization may be carried out based at least in part on whether a resource involves a downgrade or upgrade transformation, and/or a set resource optimization parameters for resources that involve an upgrade transformation. In some embodiments, the optimized resource transformation scenario may provide additional data such as, for example, data describing the type of transformation required for a resource (e.g., downgrade or upgrade), the time and/or cost associated with the transformation, an indication of whether the resource is going to be underused during the demand surge scenario, and/or the like. Accordingly, in various embodiments, the optimized resource transformation scenario may be used in carrying out one or more resource transformation actions. These actions generally involve transforming the associated resources so they may be used to satisfy the one or more resource demand conditions. Depending on the embodiment, such actions may be carried out manually and/or automatically.

The term "resource optimization machine learning model" may refer to a data object that describes parameters and/or hyper-parameters (e.g., defined operations) of a model configured to optimize the use of resources requiring an upgrade transformation to address one or more resource demand conditions. For example, in some embodiments, the resource optimization machine learning model may be a supervised or an unsupervised machine learning model that is characterized by a set of resource optimization parameters to generate one or more resource priority scores for one or more resources. In other embodiments, the resource optimization machine learning model is a rule-based model that is characterized by a set of resource optimization parameters to generate one or more resource priority scores for one or more resources. Here, depending on the embodiment, the set of resource optimization parameters may involve, for example, parameters associated with a cost of transforming the resource to address the one or more resource demand conditions, a time required to transform the resource to address the one or more resource demand conditions, an opportunity cost associated with transforming the resource to address the one or more resource demand conditions, and/or the like. Accordingly, the resource priority score for a resource may describe a priority designation for using the resource to address the one or more resource demand conditions with respect to the other resources. In particular embodiments, a hybrid resource transformation scenario may be generated based at least in part on the one or more resource priority scores and a downgrade-only resource transformation scenario identifying resources that involve a downgrade transformation to satisfy the one or more resource demand conditions. In some embodiments, the hybrid resource transformation scenario may be used in generating the optimized resource transformation scenario.

The term "demand surge priority score" may refer to a data object representing an importance of satisfying the one or more resource demand conditions resulting from a demand surge scenario with respect to other demand surge scenarios that may be occurring at virtually the same time. Accordingly, in various embodiments, the demand surge priority score may be used in prioritizing simultaneously occurring demand surge scenarios so that the resource demand conditions associated with the scenario(s) of higher importance are satisfied first.

Overview

Embodiments of the disclosure provide a novel approach for addressing a demand surge scenario involving one or more resource demand conditions by systematically and proactively recommending resources that can be transformed to satisfy the resource demand conditions. Here, a resource may refer to some type of material or nonmaterial drawn upon to satisfy a resource demand condition resulting from the demand surge scenario such as, for example, a manufacturing raw material, a product, a good, a component, a commodity, equipment, a supply, personnel, a facility, and/or the like. Accordingly, various embodiments of the disclosure involve producing recommendations for resources that can be transformed for use to satisfy one or more demand surge conditions resulting from a demand surge scenario by balancing levels of effort, costs, and/or the like involved in transforming the resources better than can otherwise be performed conventionally through both manual and automated processes.

As described further herein, various embodiments of the framework involve three main components. The first of these components is a resource repository for storing data on resources that may be used in satisfying a resource demand condition. Specifically, in particular embodiments, the resource repository contains data on specific resources available to satisfy resource demand conditions and how such resources can be transformed to address the resource demand conditions. Accordingly, the resource repository is used in embodiments of the framework in identifying resources having the capability to be transformed to satisfy resource demand conditions, along with the time and cost needed to transform these resources to be used to satisfy the resource demand conditions.

The second of these components of the framework is a process for surge demand detection. Accordingly, in various embodiments, the surge demand detection process is configured to detect demand surge scenarios in real time and whether the scenarios satisfy a threshold indicating they should be addressed. Here, in particular embodiments, the surge demand detection process tracks various trend surge indicators that can be used in identifying a demand surge scenario resulting in one or more resource demand conditions. As a result of identifying a demand surge scenario that should be addressed, the surge demand detection process continues by triggering a dynamic allocation process to then generate recommendations on resources that can be transformed to address the resource demand conditions resulting from the demand surge scenario.

Thus, the third component of the framework is the dynamic allocation process. Accordingly, in various embodiments, the dynamic allocation process receives a request for specific resources to satisfy one or more resource demand conditions resulting from a demand surge scenario, and generates an optimized resource transformation scenario based at least in part on the availability, a set of resource optimization parameters, and capabilities of various resources that can be transformed to satisfy the resource demand conditions. Further detail is provided herein on the various components of the framework.

Exemplary Technical Contributions

Many major medical incidents can lead to what is referred to as a medical demand surge scenario. Such incidents include, for example, some type of mass outbreak of disease such as an epidemic or pandemic or an event that results in a high number of persons needing medical attention such as a disaster, large-scale accident, terrorist attack, and/or the like. A healthcare service facility's system resiliency is viewed as the facility's ability to survive such a medical demand surge scenario and maintain or rapidly recover operations that have been compromised due to the medical demand surge scenario. Accordingly, the healthcare service facility's medical demand surge capacity refers to the facility's ability to evaluate and care for a markedly increased volume of patients, one that challenges or exceeds normal operating capacity.

Conventional initiatives to address medical demand surge capacity typically focus on identifying adequate numbers of needed resources to address the surge scenario such as, for example, hospital beds, medical personnel, medications, supplies, and equipment. The problem with this approach is that many of these initiatives rely on having necessary standby quantities of each of these resources to address medical demand surge scenarios. In addition, many of these initiatives require adequate and timely recognition of when a medical demand surge scenario is likely to occur so that resource needs can be identified and moved expeditiously to locations where required to address resource demand conditions resulting from the medical demand surge scenario.

One approach to address some of the disadvantages associated with managing and maintaining standby quantities of resources is having systems and operations in place that can maximize the use and abilities of existing resources found within a healthcare service facility, resulting in a reduced need for standby resources. However, conventional systems and operations found within many healthcare service facilities do not have the capabilities to maximize the abilities of existing resources, leading to many technical challenges in using these conventional systems and operations for addressing a medical demand surge scenario. As a result, many healthcare service facilities are reduced to having to manually review and analyze the resources available so that they may be adequately deployed to satisfy resource demand conditions resulting from the medical demand surge scenario.

However, management of medical demand surge scenarios and the resources needed to satisfy resource demand conditions resulting from such surge scenarios is oftentimes beyond the capabilities of humans. Firstly, humans do not normally have the capability to recognize when a medical demand surge scenario is likely to occur. Some medical demand surge scenarios may be recognizable by a human because they are easily visible. For example, an event that has occurred, such as a natural disaster, resulting in a high number of persons needing medical attention may be recognizable by medical personnel at a facility expected to receive such persons. However, many medical demand surge scenarios, such as an epidemic, may begin to develop over a period of time that is not easily recognizable (e.g., visible) to a human (e.g., a few weeks) until they result in an exponential volume of patients in a short period of time. As a result, a medical service facility may be faced with an unexpected/unforeseen medical surge demand scenario that the facility has not adequately prepared the capabilities and resources to handle.

Secondly, humans do not normally have the capability to manage existing resources available to a healthcare service facility so that they can be used efficiently and effectively to address a medical demand surge scenario. Such management requires maintaining an accurate inventory of the resources available to the healthcare service facility, as well as the analytical capabilities to identify and deploy available resources in an effective, efficient, timely manner to address a medical demand surge scenario. This is especially true with respect to available resources that may need to be transformed to a different use and deployed to address a particular resource demand condition resulting from a medical demand surge scenario. Thus, management of medical demand surge scenarios and the resources needed to meet such surge scenarios is normally beyond the capabilities of the human mind. As a result, healthcare service facilities that employ manual management of medical demand surge scenarios run the risk of many dire consequences that can result from a medical demand surge scenario such as inadequate medical care of patients, unnecessary spread of infectious diseases, and loss of human life.

Accordingly, various embodiments of the disclosure provided herein address many of the technical disadvantages encountered in conventional systems and processes used in recognizing and addressing medical demand surge scenarios that result in one or more resource demand conditions that need to be satisfied to address the medical demand surge scenarios. Specifically, embodiments of the disclosure provide a novel approach that systematically and proactively recommend transformation of resources to meet resource demand conditions for specific resource demand surge scenarios. As a result, embodiments of the disclosure overcome many of the technical disadvantages of conventional systems and processes used in managing medial demand surge scenarios by providing capabilities that go beyond those seen in such conventional systems and processes.

In addition, various embodiments of the disclosure allow for management and deployment of resources to satisfy resource demand conditions resulting from resource demand scenarios that is normally handled by humans to be carried out in an automated fashion without human intervention. Here, embodiments facilitate the automatic identification and transformation of resources to satisfy resource demand conditions resulting from demand surge scenarios, as well as the automatic execution of actions to transform such resources. Thus, the disclosed solution is more effective, accurate, less error prone, and faster than manual implementations. In addition, various embodiments' implementations reduce the manual effort necessary to address resource demand conditions resulting from demand surge scenarios and reduce operational costs and inefficiencies.

Further, the systematic and proactive transformation of resources executed in various embodiments to satisfy resource demand conditions resulting from demand surge scenarios can carry out complex mathematical operations that cannot be performed by the human mind. Additionally, the solution can reduce the computational load of various systems used in performing tasks by using the recommendations for transforming resources to satisfy resource demand conditions while marginally affecting the effective throughput of these systems. Accordingly, various embodiments of the present disclosure enhance the efficiency and speed of various computing systems by providing the ability to computationally manage a very large number of resources used in satisfying resource demand conditions resulting from demand surge scenarios in an efficient manner, and make important contributions to the various computational tasks that utilize real-time/expedited processing to recognize demand surge scenarios and generate recommendations for transforming resources to satisfy resource demand conditions resulting from these demand surge scenarios. In doing so, various embodiments of the present disclosure make major technical contributions to improving the computational efficiency and reliability of various automated systems and procedures for carrying out these tasks. This, in turn, translates to more computationally efficient software systems.

Moreover, various embodiments of the present invention increase the computational efficiency of performing optimized resource transformation by generating hybrid resource transformation scenarios only in response to determining that a downgrade-only resource transformation scenario fails to satisfy one or more resource demand conditions. This in turn avoids the substantial computational costs of performing resource transformation optimizations associated with generating hybrid resource transformation scenarios when a downgrade-only resource transformation scenario fails to satisfy one or more resource demand conditions, and in doing so in some embodiments reduces the number of processing operations that need to be performed in order to perform optimized resource transformation. In this way, the noted embodiments of the present invention reduce the number of processing cycles that need to be performed in order to perform optimized resource transformation, which in turn improves the computational cost of performing optimized resource transformation and makes substantial improvements to various sub-fields of the fields of optimized resource transformation and predictive data analysis.

Computer Program Products, Systems, Methods, and Computing Entities

Embodiments of the present disclosure may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of a data structure, apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially, such that one instruction is retrieved, loaded, and executed at a time. In some exemplary embodiments, retrieval, loading, and/or execution may be performed in parallel, such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Exemplary System Architectures

Figure 1:
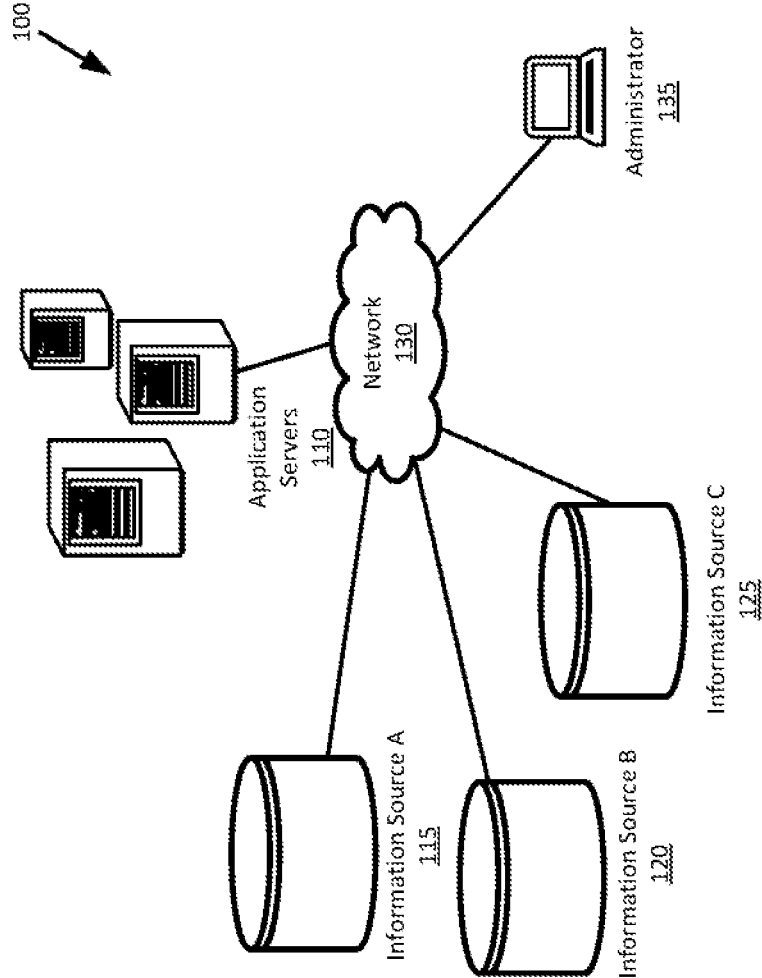
FIG. 1 is a diagram of a system architecture that can be used in conjunction with various embodiments of the present disclosure.

FIG. 1 provides an illustration of a system architecture 100 that may be used in accordance with various embodiments of the disclosure. Here, the architecture 100 includes various components involved in identifying demand surge scenarios, generating optimized resource transformation scenarios for such demand surge scenarios, and/or executing one or more actions to have resources identified in the optimized resource transformation scenarios transformed so that such resources can satisfy resource demand conditions resulting from the demand surge scenarios. Accordingly, the components may include one or more application servers 110 that may be in communication with and one or more data sources 115, 120, 125 over one or more networks 130. It should be understood that the application server(s) 110 may be made up of several servers, storage media, layers, and/or other components, which may be chained or otherwise configured to interact and/or perform tasks. Specifically, the application server(s) 110 may include any appropriate hardware and/or software for interacting with the data sources 115, 120, 125 as needed to execute aspects of one or more applications for processing data acquired from the data sources 115, 120, 125 and handling data access and business logic for such.

In addition, the architecture 100 may include one or more computing devices 135 used by individuals for conducting one or more processes that make use of optimized resource transformation scenarios generated for identified demand surge scenarios. For example, the computing devices 135 may be used by administrators at a healthcare service facility in conducting an analysis on an optimized resource transformation scenario generated for a demand surge scenario to identify which available resources should be transformed to satisfy one or more resource demand conditions resulting from the demand surge scenario, and to initiate one or more transformation actions accordingly. Here, the device(s) 135 may be one of many different types of devices such as, for example, a desktop or laptop computer or a mobile device such as a smart phone or tablet.

As noted, the application server(s) 110, data sources 115, 120, 125, and computing device(s) 135 may communicate with one another over one or more networks 130. Depending on the embodiment, these networks 130 may comprise any type of known network such as a land area network (LAN), wireless land area network (WLAN), wide area network (WAN), metropolitan area network (MAN), wireless communication network, the Internet, etc., or combination thereof. In addition, these networks 130 may comprise any combination of standard communication technologies and protocols. For example, communications may be carried over the networks 130 by link technologies such as Ethernet, 802.11, CDMA, 3G, 4G, or digital subscriber line (DSL). Further, the networks 130 may support a plurality of networking protocols, including the hypertext transfer protocol (HTTP), the transmission control protocol/internet protocol (TCP/IP), or the file transfer protocol (FTP), and the data transferred over the networks 130 may be encrypted using technologies such as, for example, transport layer security (TLS), secure sockets layer (SSL), and internet protocol security (IPsec). Those skilled in the art will recognize FIG. 1 represents but one possible configuration of a system architecture 100, and that variations are possible with respect to the protocols, facilities, components, technologies, and equipment used.

Exemplary Computing Entity

Figure 2:
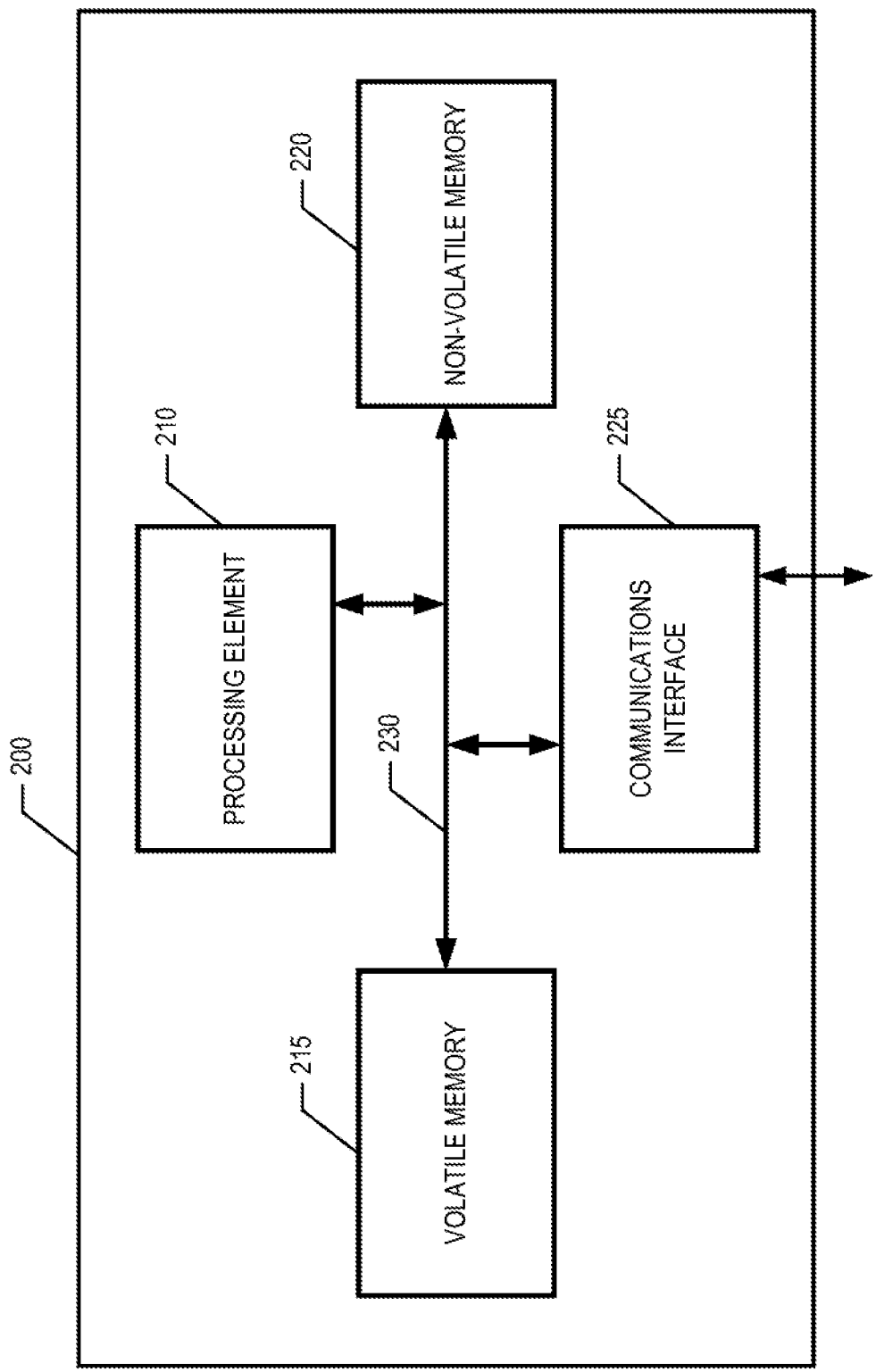
FIG. 2 is a schematic of a computing entity that may be used in conjunction with various embodiments of the present disclosure.

FIG. 2 provides a schematic of a computing entity 200 that may be used in accordance with various embodiments of the present disclosure. For instance, the computing entity 200 may be one or more of the application servers 110, and in some instances one or more of the computing devices 135, previously described in FIG. 1. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

Although illustrated as a single computing entity, those of ordinary skill in the art should appreciate that the computing entity 200 shown in FIG. 2 may be embodied as a plurality of computing entities, tools, and/or the like operating collectively to perform one or more processes, methods, and/or steps. As just one non-limiting example, the computing entity 200 may comprise a plurality of individual data tools, each of which may perform specified tasks and/or processes.

Depending on the embodiment, the computing entity 200 may include one or more network and/or communications interfaces 225 for communicating with various computing entities, such as by communicating data, content, information, and/or similar terms used herein interchangeably that can be transmitted, received, operated on, processed, displayed, stored, and/or the like. Thus, in certain embodiments, the computing entity 200 may be configured to receive data from one or more data sources and/or devices as well as receive data indicative of input, for example, from a device.

The networks used for communicating may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks may have any suitable communication range associated therewith and may include, for example, global networks (e.g., the Internet), MANs, WANs, LANs, or PANs. In addition, the networks may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Accordingly, such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the computing entity 200 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The computing entity 200 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

In addition, in various embodiments, the computing entity 200 includes or is in communication with one or more processing elements 210 (also referred to as processors, processing circuitry, and/or similar terms used herein interchangeably) that communicate with other elements within the computing entity 200 via a bus 230, for example, or network connection. As will be understood, the processing element 210 may be embodied in several different ways. For example, the processing element 210 may be embodied as one or more complex programmable logic devices (CPLDs), microprocessors, multi-core processors, coprocessing entities, application-specific instruction-set processors (ASIPs), and/or controllers. Further, the processing element 210 may be embodied as one or more other processing devices or circuitry. The term circuitry may refer to an entirely hardware embodiment or a combination of hardware and computer program products. Thus, the processing element 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 210 may be configured for a particular use or configured to execute instructions stored in volatile or non-volatile media or otherwise accessible to the processing element 210. As such, whether configured by hardware, computer program products, or a combination thereof, the processing element 210 may be capable of performing steps or operations according to embodiments of the present disclosure when configured accordingly.

In various embodiments, the computing entity 200 may include or be in communication with non-volatile media (also referred to as non-volatile storage, memory, memory storage, memory circuitry and/or similar terms used herein interchangeably). For instance, the non-volatile storage or memory may include one or more non-volatile storage or memory media 220, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media 220 may store files, databases, database instances, database management system entities, images, data, applications, programs, program modules, scripts, source code, object code, byte code, compiled code, interpreted code, machine code, executable instructions, and/or the like. The term database, database instance, database management system entity, and/or similar terms used herein interchangeably and, in a general sense, to refer to a structured or unstructured collection of information/data that is stored in a computer-readable storage medium.

In particular embodiments, the memory media 220 may also be embodied as a data storage device or devices, as a separate database server or servers, or as a combination of data storage devices and separate database servers. Further, in some embodiments, the memory media 220 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. As already discussed, various embodiments contemplated herein communicate with various information sources and/or devices in which some or all the information/data required for various embodiments of the disclosure may be stored.

In various embodiments, the computing entity 200 may further include or be in communication with volatile media (also referred to as volatile storage, memory, memory storage, memory circuitry and/or similar terms used herein interchangeably). For instance, the volatile storage or memory may also include one or more volatile storage or memory media 215 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media 215 may be used to store at least portions of the databases, database instances, database management system entities, data, images, applications, programs, program modules, scripts, source code, object code, byte code, compiled code, interpreted code, machine code, executable instructions, and/or the like being executed by, for example, the processing element 210. Thus, the databases, database instances, database management system entities, data, images, applications, programs, program modules, scripts, source code, object code, byte code, compiled code, interpreted code, machine code, executable instructions, and/or the like may be used to control certain aspects of the operation of the computing entity 200 with the assistance of the processing element 210 and operating system.

As will be appreciated, one or more of the computing entity's components may be located remotely from other computing entity components, such as in a distributed system. Furthermore, one or more of the components may be aggregated and additional components performing functions described herein may be included in the computing entity 200. Thus, the computing entity 200 can be adapted to accommodate a variety of needs and circumstances.

Exemplary System Operations

The logical operations described herein may be implemented (1) as a sequence of computer implemented acts or one or more program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. Greater or fewer operations may be performed than shown in the figures and described herein. These operations may also be performed in a different order than those described herein.

Exemplary Data Architecture

Figure 3:
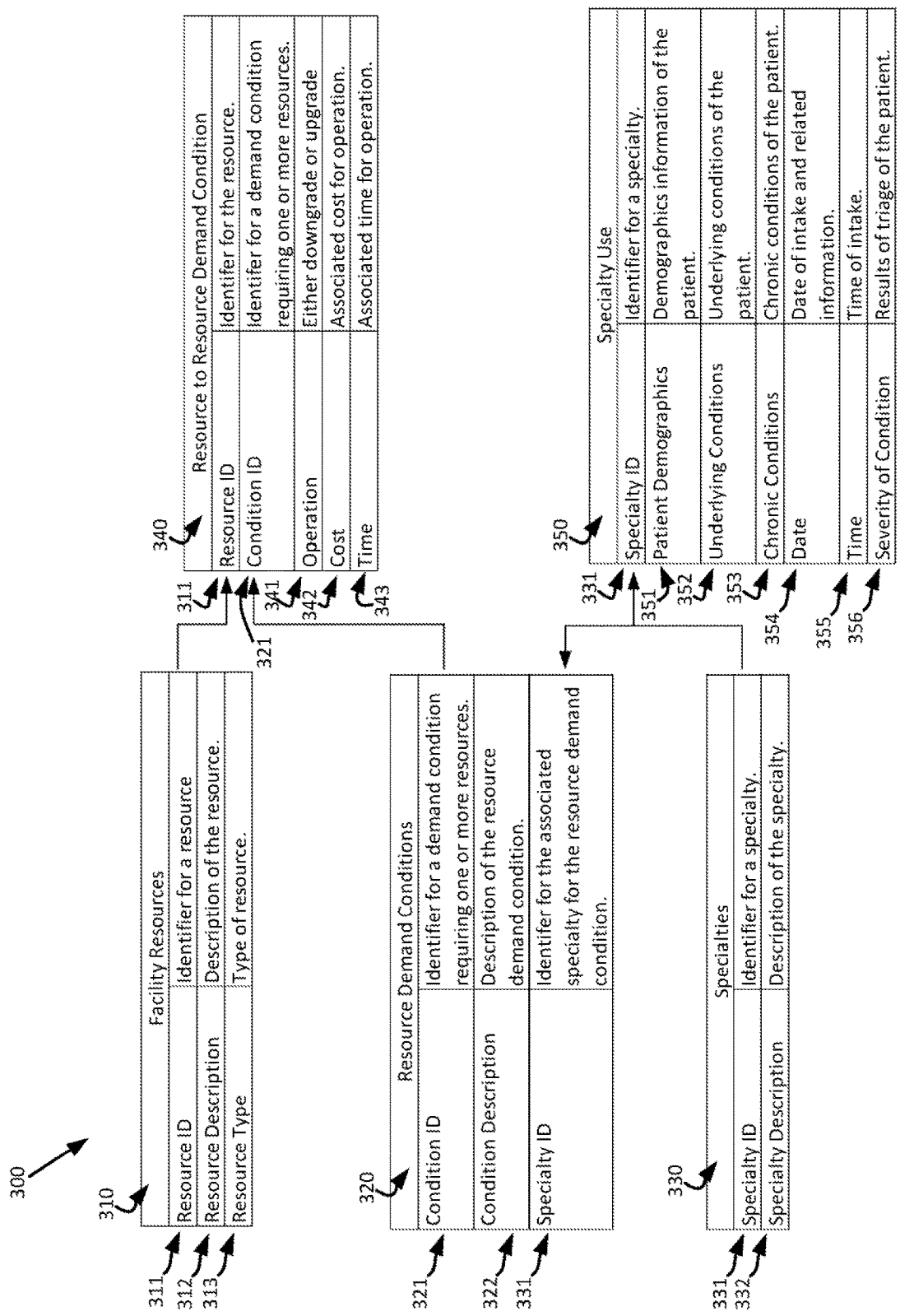
FIG. 3 is a data architecture that can be used in accordance with various embodiments of the present disclosure.

FIG. 3 provides a data architecture 300 for storing data on resources available to a facility in accordance with various embodiments of the disclosure. For instance, this particular architecture 300 may be utilized as a resource repository provided via one or more file structures and/or one or more database structures in particular embodiments. Accordingly, the primary structures 310, 320, 330, 340, 350 shown in FIG. 3 may be constructed as individual files or tables depending on whether a file structure or a database structure is used.

Looking at FIG. 3, the architecture 300 includes a Facility Resources structure 310 configured to store data on various resources that are available to a facility. For instance, the facility may be a healthcare service facility (e.g., hospital) and the resources available to the facility may include medical personnel, medical equipment, medications, various types of facilities such as ICU rooms and operating rooms, and/or the like. For this particular configuration, the Facility Resources structure 310 includes a resource identifier (Resource ID 311) for each available resource that uniquely identifies the resource. Accordingly, this identifier can be used to retrieve, as well as associate, data stored in other data structures for the resource. The Facility Resources structure 310 may also include a description of the resource (Resource Description 312) that provides a general description of the resources such as, for example, ICU room. In addition, the Facility Resources structure 310 includes a resource type (Resource Type 313) that identifies a type for the resource such as, for example, employee, medical equipment, medical supply, facility structure, and/or the like. Depending on the embodiment, the Facility Resources structure 310 may include other data and/or the data may be separated out into multiple data elements (e.g., fields) and/or multiple structures for storage purposes.

In addition, the architecture 300 in this particular instance includes a Specialties structure 330 configured to store data on various medical specialties provided by healthcare service facility. For example, a medical specialty provided by the healthcare service facility may include outpatient surgeries, emergency room services, ICU services, chemotherapy treatments, and/or the like. Similar to the Facility Resources structure 310, the Specialties structure 330 includes an identifier (Specialty ID 331) and a description (Specialty Description 332) for each of the specialties provided by the healthcare service facility. In various embodiments, the use of these specialties are monitored to identify demand surge scenarios involving the specialties. For example, a demand surge scenario may involve an increased demand for ICU services due to the outbreak of an epidemic. Accordingly, one or more resource demand conditions can result from the occurrence of a demand surge scenario. For example, a demand surge scenario involving the increased demand for ICU services may result in resource demand conditions related to requirements for isolation spaces (e.g., rooms and/or beds) and the need for additional medical staff to assist in the ICU unit.

Thus, the data architecture 300 in this particular instance also includes a Resource Demand Conditions structure 320 configured to store data for the different resource demand conditions that may result from a demand surge scenario. The Resource Demand Conditions structure 320 includes an identifier (Condition ID 321) for each resource demand condition that may occur that uniquely identifies the condition and can be used to retrieve, as well as associate, data stored in other data structures for the condition. In addition, the Resource Demand Conditions structure 320 includes a data element (Condition Description 322) that provides a general description of the resource demand condition. Further, the Resource Demand Conditions structure 320 includes a specialty identifier (Specialty ID 331) for the specialty associated with the resource demand condition. Therefore, returning to the example involving the specialty of ICU services, the Resource Demand Conditions structure 320 may include a data entry (e.g., a record) for the resource demand condition resulting from a demand surge scenario involving increased demand for ICU services that is related to the requirement for isolation spaces. Accordingly, this data entry may include the specialty identifier (Specialty ID 331) for ICU services to indicate this particular resource demand condition is related to a demand surge scenario involving this specialty.

Continuing on, the data architecture 300 shown in FIG. 3 includes a Resource to Resource Demand Condition structure 340 that is configured to store data on the resources that can be used and/or transformed to satisfy one or more resource demand conditions. Accordingly, the Resource to Resource Demand Condition structure 340 includes the resource identifier (Resource ID 310) and the resource demand condition identifier (Condition ID 321). Here, the combination of these two data elements for a particular data entry indicates the resource associated with the resource identifier for the entry can be used to satisfy the resource demand condition associated with the resource demand condition identifier for the entry.

For instance, returning to the example involving a demand surge scenario involving an increase in demand for ICU services at a healthcare service facility due to an epidemic resulting in a resource demand condition for isolation space, a data entry may be found in the Resource to Resource Demand Condition structure 340 for this resource demand condition with respect to a resource available to the healthcare service facility that is a room in the facility currently being used for office space. Here, this data entry may have a combination of the resource identifier for the room being used as office space and the resource demand condition identifier for the resource demand condition for isolation space. Accordingly, this combination may identify that the room being used as office space can be used to satisfy the need for isolation space.

In this example, the room currently being used as office space may need to be transformed so that it may then be used as isolation space for patients. For example, the office equipment currently in the room may need to be removed, and beds and monitoring equipment for patients may need to be installed in the room so that it may be used as isolation space. Therefore, the Resource to Resource Demand Condition structure 340 may include one or more data elements storing data on transforming the resource so that the resource may satisfy the corresponding resource demand condition. For instance, the Resource to Resource Demand Condition structure 340 may include a data element (Operation 341) identifying whether the transformation of the resource involves a downgrade or an upgrade.

As discussed further herein, a downgrade transformation in various embodiments may involve a transformation in which the resource can be transformed to satisfy a resource demand condition at no cost or at a cost that satisfies a cost threshold. For example, the cost threshold may be set at $15,000, and therefore in this example, a transformation may be identified as a downgrade if the cost of transforming the resource to satisfy the resource demand condition is $15,000 or less. Conversely, in this example, the transformation may be identified as an upgrade if the cost is over $15,000. Other factors may be considered in some embodiments in identifying a transformation as either a downgrade or an upgrade. For example, the time required to transform the resource so that the resource may be used to satisfy the resource demand condition may be considered in identifying the transformation for the resource as either a downgrade or an upgrade. Those of ordinary skill in the art can envision other factors, or combinations thereof, that may be used in identifying a transformation of a resource as either a downgrade or an upgrade in light of this disclosure. Therefore, in various embodiments, the Resource to Resource Demand Condition structure 340 may include one or more data elements for storing data associated with the transformation of the resource, such as cost (Cost 342), time (Time 343), and/or the like.

Finally, the data architecture 300 shown in FIG. 3 includes a Specialty Use structure 350 configured for storing data on various resource demand indicators that may be used in identifying demand surge scenarios. In this instance, the Specialty Use structure 350 shown in FIG. 3 is configured based at least in part on the example involving the healthcare service facility. Here, the healthcare service facility may be interested in identifying demand surge scenarios that involve a markedly increase intake of patients that may result in a demand surge scenario for one or more specialties being offered by the healthcare service facility. Therefore, the Specialty Use structure 350 may include the specialty identifier (Specialty ID 331) to identify the specialty associated with the resource demand indicators (e.g., a data entry of resource demand indicators). Each data entry in the Specialty Use structure 350 may involve a specific instance of a patient's use/need of the specialty at the healthcare service facility. For example, the data used to populate the Specialty Use structure 350 may be acquired from one or more intake of patient systems used within the healthcare service facility. Thus, the resource demand indicators may include data such as, for example, demographics on the patient (Patient Demographics 351), underlying medical conditions experienced by the patient (Underlying Conditions 352), chronic medical conditions experienced by the patient (Chronic Conditions 353), date (Date 354) and time (Time 355) of the patient's use/need of the specialty, severity of the condition (Severity of Condition 356) leading to the use/need of the specialty, and/or the like. Accordingly, the Specialty Use structure 350 may include other data and/or the data may be separated out into multiple data elements (e.g., fields) and/or multiple structures for storage purposes.

Demand Surge Module

Figure 4:
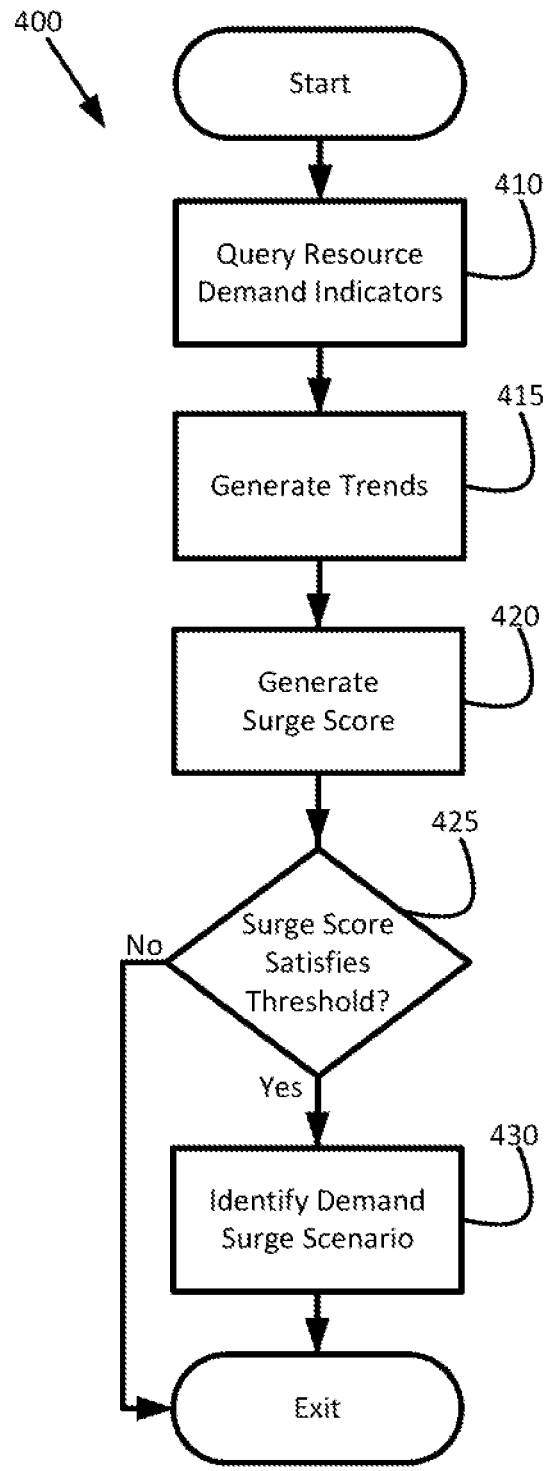
FIG. 4 is a process flow for identifying a demand surge scenario in accordance with various embodiments of the present disclosure.

Turning now to FIG. 4, additional details are provided regarding a process flow for identifying a demand surge scenario according to various embodiments. FIG. 4 is a flow diagram showing a demand surge module for performing such functionality according to various embodiments of the disclosure. For example, the flow diagram shown in FIG. 4 may correspond to operations carried out by a processing element 210 in a computing entity 200, such as an application server 110 described in FIG. 1, as it executes the demand surge module stored in the computing entity's volatile and/or nonvolatile memory.

Therefore, the process flow 400 begins in various embodiments with the demand surge module querying one or more resource demand indicators from the resource repository in Operation 410. Accordingly, in particular embodiments, the resource demand indicators may be associated with a particular tangible or nontangible item such as a product or service (e.g., a specialty provided by a healthcare service facility) in which an entity is interested in determining whether a demand surge scenario may be occurring related to the tangible or nontangible item. Here, the demand surge module may be configured to query the resource demand indicators for a specific window of time such as, for example, for a month. Therefore, the queried resource demand indicators are associated with data collected for the indicators over the specific window of time.

The demand surge module then generates one or more trends using the one or more resource demand indicators in Operation 415. Specifically, in various embodiments, the demand surge module is configured to use a trend surge prediction machine learning model configured to generate a trend surge indicator representing the current trend for the development of a demand surge scenario based at least in part on a recent trend for the one or more resource demand indicators. Depending on the embodiment, the trend surge prediction machine learning model may be configured as any number of different types of models in predicting the current trend in developing the demand surge scenario such as, for example, a combination of one or more of exponential moving average models, auto regression models, linear regression models, polynomial regression models, autoregressive-moving-average models, seasonal autoregressive-moving-average models, autoregressive-integrated-moving-average models, recurrent neural network models, and/or the like.

Accordingly, the one or more resource demand indicators may be processed using the trend surge prediction machine learning model to generate a prediction as to whether a recent trend has developed with respect to one or more resource demand conditions associated with the one or more resource demand indicators. For example, the one or more resourced demand indicators may be based at least in part on data gathered on the intake of patients at a healthcare service facility with respect to a specialty offered by the facility. Therefore, the prediction generated by the trend surge prediction machine learning model may indicate whether the healthcare service facility is experiencing a current increase in demand for the specialty, leading to one or more resource demand conditions. In particular embodiments, the demand surge module may be further configured to generate a trend surge indicator based at least in part on the prediction. For instance, in some embodiments, the demand surge module may generate the trend surge indicator as the percentage of inclination in the slope of the recent trend prediction. Here, the demand surge module may transform the degrees of the slope to a value between zero and one.

Although the trend surge indicator may measure the recent trend with respect to the one or more resource demand conditions, the trend surge indicator may be affected by any seasonality factors. For example, the patient intake for a particular specialty at a healthcare service facility may be affected by seasonality factors such as flu season, college holidays, national holidays (e.g., Easter), and/or the like. Therefore, to balance the trend surge indicator with a better view of seasonality trends in the past, the trend surge module is configured in various embodiments to generate a historical surge indicator. An operational example of a recent trend generation is depicted in FIG. 9.

Accordingly, in particular embodiments, the trend surge module generates the historical surge indicator by using a historical surge prediction machine learning model configured to generate a prediction on a historical trend for the development of the demand surge scenario based at least in part on a cyclical trend for the one or more resource demand indicators associated with the one or more resource demand conditions. Similar to the trend surge prediction machine learning model, depending on the embodiment, the historical surge prediction machine learning model may be configured as any number of different types of models in predicting the historical trend for developing the demand surge scenario such as, for example, a combination of one or more of exponential moving average models, auto regression models, linear regression models, polynomial regression models, autoregressive-moving-average models, seasonal autoregressive-moving-average models, autoregressive-integrated-moving-average models, recurrent neural network models, and/or the like. Thus, in particular embodiments, the demand surge module may be further configured to generate the historical surge indicator based at least in part on the historical trend prediction. For instance, in some embodiments, the demand surge module may generate the historical surge indicator as the difference in the slope of the recent trend prediction and the historical trend prediction. Again, the demand surge module may transform the difference in the slope to a value between zero and one. An operational example of a historical trend generation is depicted in FIG. 10.

At this point, in various embodiments, the trend surge module generates a surge score by combining the trend surge indicator and the historical surge indicator in Operation 420. For example, in particular embodiments, the trend surge module generates the surge score as the trend surge indicator plus the historical surge indicator, divided by two. Depending on the embodiment, the trend surge module may be configured to use any one of different computations in combining the two indicators to generate the surge score based at least in part on the types of models and measures used for the current trend prediction and historical trend prediction. Accordingly, the main focus of the surge score in various embodiments is to balance the trend surge prediction against the historical surge prediction.

The trend surge module then determines whether the surge score satisfies a surge threshold in Operation 425. Here, in particular embodiments, the value of the surge threshold may be determined based at least in part on the knowledge of subject matter experts or the temporality of the surge scenarios and the facility being monitored. In some embodiments, the surge threshold may be adapted using a machine learning model configured to identify the optimal value for the threshold.

Accordingly, if the trend surge module determines the surge score satisfies the surge threshold, then the trend surge module identifies an occurrence of a demand surge scenario in Operation 430. Here, the demand surge scenario may be associated with one or more resource demand conditions that are a result of the demand surge scenario. For instance, returning to the example of the healthcare service facility evaluating whether a surge in demand for ICU service may be occurring, if such a demand surge scenario is identified to be occurring, then the resource demand conditions resulting from the demand surge scenario may include increased need of isolation space for patients and increased need of medical personnel to assist in the ICU unit at the facility. As discussed further herein, at this point, various embodiments of the disclosure involve identifying resources that can be transformed to satisfy the one or more resource demand conditions resulting from the demand surge scenario.

It is noted that in some embodiments, the trend surge module may be executed in parallel across the different tangible or nontangible items (e.g., across the different specialties offered by the healthcare service facility) and/or resource demand indicators to evaluate each of the different tangible or nontangible items. Such an approach may be carried out to ensure detection of different demand surge scenarios that may be overlapping and/or producing similar resource demand conditions. As detailed further herein, depending on the embodiment, multiple demand surge scenarios occurring at virtually the same time may be handled by identifying the resources that can be transformed to satisfy the resource demand conditions for each demand surge scenario independently or by merging the resource demand conditions for the multiple demand surge resources and then identifying the resources that can be transformed to satisfy the combined resource demand conditions.

Multiple Demand Surge Module

Figure 5:
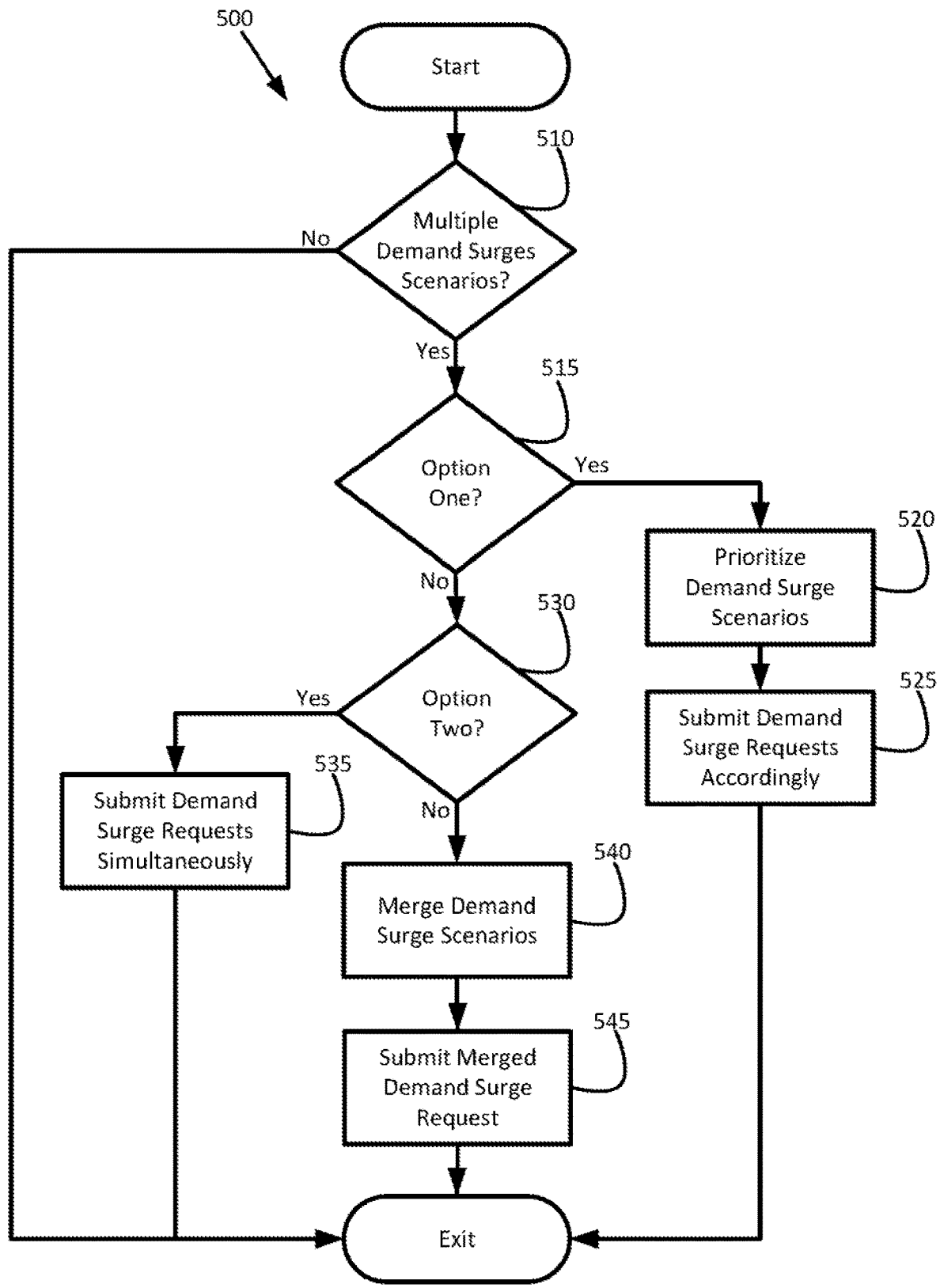
FIG. 5 is a process flow for addressing multiple demand surge scenarios in accordance with various embodiments of the present disclosure.

Turning now to FIG. 5, additional details are provided regarding a process flow for addressing multiple demand surge scenarios according to various embodiments. FIG. 5 is a flow diagram showing a multiple demand surge module for performing such functionality according to various embodiments of the disclosure. For example, the flow diagram shown in FIG. 5 may correspond to operations carried out by a processing element 210 in a computing entity 200, such as an application server 110 described in FIG. 1, as it executes the multiple demand surge module stored in the computing entity's volatile and/or nonvolatile memory.

Here, in some embodiments, the multiple demand surge module may be invoked in response to identifying a demand surge scenario. For example, the demand surge module previously discussed may be configured to invoke the multiple demand surge module upon identifying the occurrence of a demand surge scenario.

Therefore, the process flow 500 begins in various embodiments with the multiple demand surge module determining whether multiple demand surge scenarios are occurring at virtually the same time in Operation 510. Depending on the circumstances, the multiple demand surge scenarios may have developed simultaneously are may be overlapping, with a first demand surge scenario developing initially and a second demand surge scenario developing at a later time. For example, an epidemic may cause simultaneous occurrences of demand surge scenarios for a healthcare service facility. Specifically, the epidemic may clause a first demand surge scenario with respect to ICU services offered by the healthcare service facility and a second demand surge scenario with respect to laboratory testing services offered by the healthcare service facility. While in another example, the epidemic may cause a first demand surge scenario with respect to ICU services offered by the healthcare service facility to initially occur and the flu season may clause a second demand surge scenario with respect to the ICU services offered by the healthcare service facility to occur after the first demand surge scenario has begun.

If the multiple demand surge module determines that multiple demand surge scenarios are not occurring, then the multiple demand surge module simply exits. Here, in various embodiments, an optimized resource transformation scenario may then be generated for the demand surge scenario that has been identified. However, if the multiple demand surge module determines that multiple demand surge scenarios are occurring, then the multiple demand surge module determines how to handle satisfying the one or more resource demand conditions resulting from the multiple demand surge scenarios.

Accordingly, in various embodiments, one or more options may be available to handle the multiple demand surge scenarios that are occurring at virtually the same time. In some embodiments, a first option may involve prioritizing the demand surge scenarios with respect to one another. In particular embodiments, a demand surge priority score may be generated for each demand surge scenario based at least in part on one or more parameters. For example, a healthcare service facility may use a parameters such as $r^2$ score that is a ratio of transmission for a disease to generate the demand surge priority score for a particular demand surge scenario. While in another example, the healthcare service facility may use another parameter such as mortality rate associated with a disease. Such parameters may be gathered from expert organizations such as the World Health Organization (WHO) or may be calculated by the healthcare service facility to reflect local regions. This first option may work well in cases where a first demand surge scenario (e.g., an epidemic caused by a highly infectious virus) has a higher potential effect (e.g., a higher potential death rate) than the other demand surge scenario(s) so that satisfying the resource demand conditions for the first demand surge scenario is given priority.

A second option may involve processing the multiple demand surge scenarios simultaneously, without prioritizing one demand surge scenario over another. This particular option may work well in instances where the demand surge scenarios are caused by external factors like, for example, a terrorist attack, a fire in a national park, emergency in a highly occupied building, and/or the like. Therefore, oftentimes for such scenarios, a parameter such as r2 or mortality rate does not necessarily exist due to the external factors that can be used in prioritizing the demand surge scenarios.

Finally, a third option may involve merging the multiple demand surge scenarios by merging the resource demand conditions resulting from the multiple demand surge scenarios. The merged demand surge scenarios may then be treated as a single demand surge scenario in identifying resources to transform to satisfy the resource demand conditions for all of the demand surge scenarios. This option may work well when a good number of the resource demand conditions for the multiple demand surge scenarios overlap. For example, multiple demand surge scenarios related to outbreaks of two different diseases resulting in a need for ICU services.

Therefore, returning to FIG. 5, the multiple demand surge module determines whether to exercise the first option involving prioritizing the multiple demand surge scenarios in Operation 515. Here, for example, the multiple demand surge module may be configured to evaluate whether to use this option for the multiple demand surge scenarios based at least in part on an indicator that is set identifying that the first option should be exercised for the multiple demand surge scenarios. In other embodiments, the multiple demand surge module may be configured to evaluate one or more parameters and/or characteristics of the demand surge scenarios in determining whether to exercise the first option. For example, the multiple demand surge module may determine whether the multiple demand surge scenarios involve infectious diseases or other medical issues such as medical emergencies due to an event such as a fire.

Therefore, if the multiple demand surge module determines the first option should be exercised for the multiple demand surge scenarios, then the multiple demand surge module prioritizes the demand surge scenarios in Operation 520. As previously noted, the multiple demand surge module may be configured in various embodiments to use demand surge priority scores in prioritizing the multiple demand surge scenarios. Once prioritized, the multiple demand surge module may generate and submit demand surge requests for the demand surge scenarios according to the priority in Operation 525. As discussed further herein, a demand surge request entails a request to have resources identified for the demand surge scenarios that can be transformed to satisfy the resource demand conditions resulting from the demand surge scenario. As further discussed, such resources may be identified in various embodiments in an optimized resource transformation scenario.

If the multiple demand surge module determines the first option should not be exercised for the multiple demand surge scenarios, then the multiple demand surge module determines whether a second option should be exercised for the multiple demand surge scenarios in Operation 530. Here, the second option involves processing the multiple demand surge scenarios simultaneously to identify the resources that can be transformed to satisfy the resource demand conditions for the demand surge scenarios. Again, in particular embodiments, the multiple demand surge module may be configured to evaluate whether to use the second option for the multiple demand surge scenarios based at least in part on, for example, whether an indicator has been set identifying the option should be exercised or by evaluating one or more parameters and/or characteristics of the multiple demand surge scenarios.

Therefore, if the multiple demand surge module determines the second option should be exercised for the multiple demand surge scenarios, then the multiple demand surge module submits demand surge requests for the demand surge scenarios simultaneously in Operation 535. As a result, an optimized resource transformation scenario may be generated for each demand surge scenario identifying resources that can be transformed to satisfy the resource demand conditions for the demand surge scenario. Here, in particular embodiments, the optimized resource transformation scenarios may be generated for the multiple demand surge scenarios with respect to one another and the resource demand conditions that need to be satisfied for the multiple demand surge scenarios. Therefore, if a particular resource is identified in the optimized resource transformation scenario for a particular demand surge scenario, then the resource may not be identified, or be identified with a lower priority, in the optimized resource transformation scenario for a different demand surge scenario.

Finally, if the multiple demand surge module determines that neither the first option nor the second option should be exercised for the multiple demand surge scenarios, then the multiple demand surge module exercises the third option by merging the demand surge scenarios in Operation 540. Here, the multiple demand surge module may carry out this particular operation in various embodiments by merging the resource demand conditions for the different demand surge modules. This may involve combining the resource demand conditions across the multiple demand surge scenarios. Once combined, the multiple demand surge module submits a demand surge request for the combined demand surge scenarios in Operation 545. As a result, the multiple demand surge scenarios may be treated as a single scenario in which a single optimized resource transformation scenario is generated to satisfy the resource demand conditions for all of the demand surge scenarios.

Demand Surge Rollback Module

As noted throughout, various embodiments of the disclosure involve generating an optimized resource transformation scenario for an identified demand surge scenario in which the optimized resource transformation scenario identifies resources that may be transformed to satisfy one or more resource demand conditions resulting from the demand surge scenario. For example, a resource demand condition resulting from a demand surge scenario may involve the need for isolation space at a healthcare service facility to be used for patients who are admitted to the facility as a result of an epidemic. In this example, the optimized resource transformation scenario may identify a room in the facility that is currently being used for office space that could be transformed into isolation space for patients. Therefore, the healthcare service facility may transform the room accordingly so that the room may then be used for isolation space.

However, the epidemic (the demand surge scenario) causing the need for the isolation space eventually subsides and the isolation space is no longer needed. Therefore, in various embodiments, the demand surge scenario is monitored so that when the scenario appears to be coming to end, the resources may be rolled back to their previous use. That is to say, in the example, the room may no longer be used for isolation space, and may be returned to being used for office space.

Figure 6:
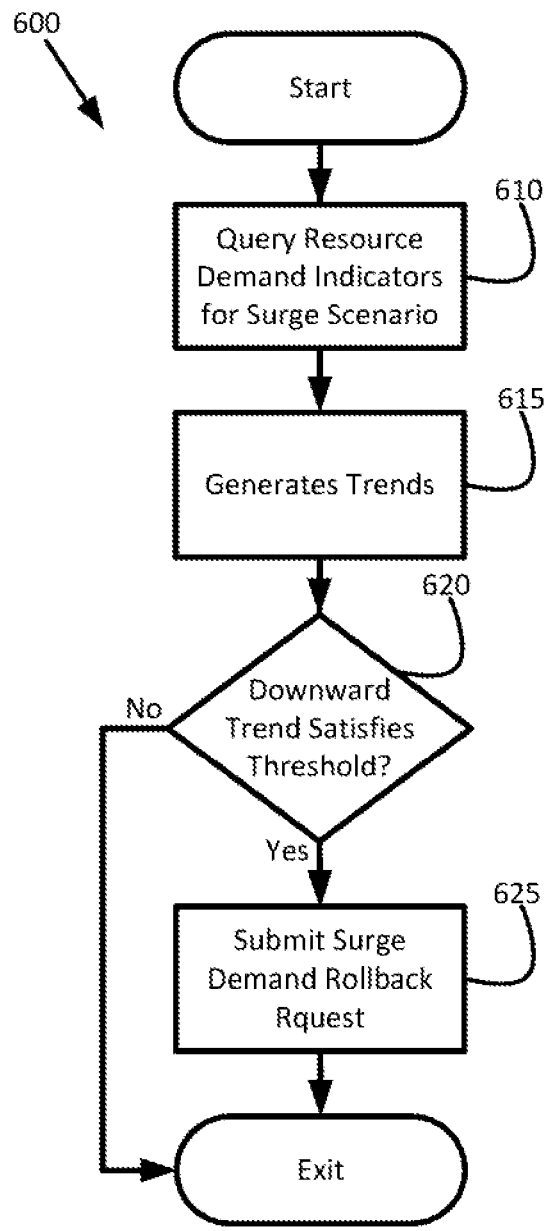
FIG. 6 is a process flow for identifying a rollback of a demand surge scenario in accordance with various embodiments of the present disclosure.

Therefore, turning now to FIG. 6, additional details are provided regarding a process flow for rolling back a demand surge scenario according to various embodiments. FIG. 6 is a flow diagram showing a Demand Surge Rollback Module for performing such functionality according to various embodiments of the disclosure. For example, the flow diagram shown in FIG. 6 may correspond to operations carried out by a processing element 210 in a computing entity 200, such as an application server 110 described in FIG. 1, as it executes the Demand Surge Rollback Module stored in the computing entity's volatile and/or nonvolatile memory.

The process flow 600 begins with the Demand Surge Rollback Module querying the resource demand indicators associated with the demand surge scenario in Operation 610. Therefore, in various embodiments, the Demand Surge Rollback Module queries data for the indicators from the resource repository. Such data may be similar to the data that was used in identifying the demand surge scenario. Once queried, the Demand Surge Rollback Module generates one or more trends for the demand surge scenario in Operation 615. Accordingly, in particular embodiments, the Demand Surge Rollback Module may be configured to generate the one or more trends for the demand surge scenario in the same manner as the demand surge module previously discussed. However, in this instance, the Demand Surge Rollback Module is evaluating whether a downward trend is developing with respect to the one or more resource demand conditions associated with the demand surge scenario. For instance, a "downward trend" may identify when the demand for one or more resources used to satisfy the one or more resource demand conditions is diminishing.

Therefore, the Demand Surge Rollback Module determines whether the downward trend satisfies a threshold in Operation 620. If so, then the Demand Surge Rollback Module submits a surge demand rollback request in Operation 625. As a result, a rollback resource transformation scenario may be generated that identifies the resources that can be rolled back so that they may have the capacity to be used for the purpose intended prior to being transformed to satisfy the one or more resource demand conditions resulting from the demand surge scenario. Thus, in the example involving the isolation space in the healthcare service facility, the room transformed so that it could be used as isolation space may be transformed back so that it may again be used for office space.

Accordingly, in various embodiments, the Demand Surge Rollback Module may be configured so that the module is invoked periodically to evaluate the surge demand scenarios that are currently occurring at a facility. For example, the Demand Surge Rollback Module may be involved daily to evaluate each surge demand scenario that is currently occurring to determine whether a rollback process should be initiated for the resources transformed to address the surge demand scenario.

Dynamic Allocation Module

Once a demand surge scenario has been identified, various embodiments of the disclosure involve identifying one or more resources that can be transformed to satisfy one or more resource demand conditions resulting from the demand surge scenario. Here, an optimized resource transformation scenario may be generated that identifies the one or more resources that can be transformed to satisfy the one or more resourced demand conditions. Accordingly, the one or more resources may be identified based at least in part on optimizing one or more parameters with respect to the resources. For example, optimization may be carried out in particular embodiments with respect to parameters such as cost of transforming the resources, time required to transform the resources, opportunity cost associated with transforming the resources, and/or the like.

Figure 7:
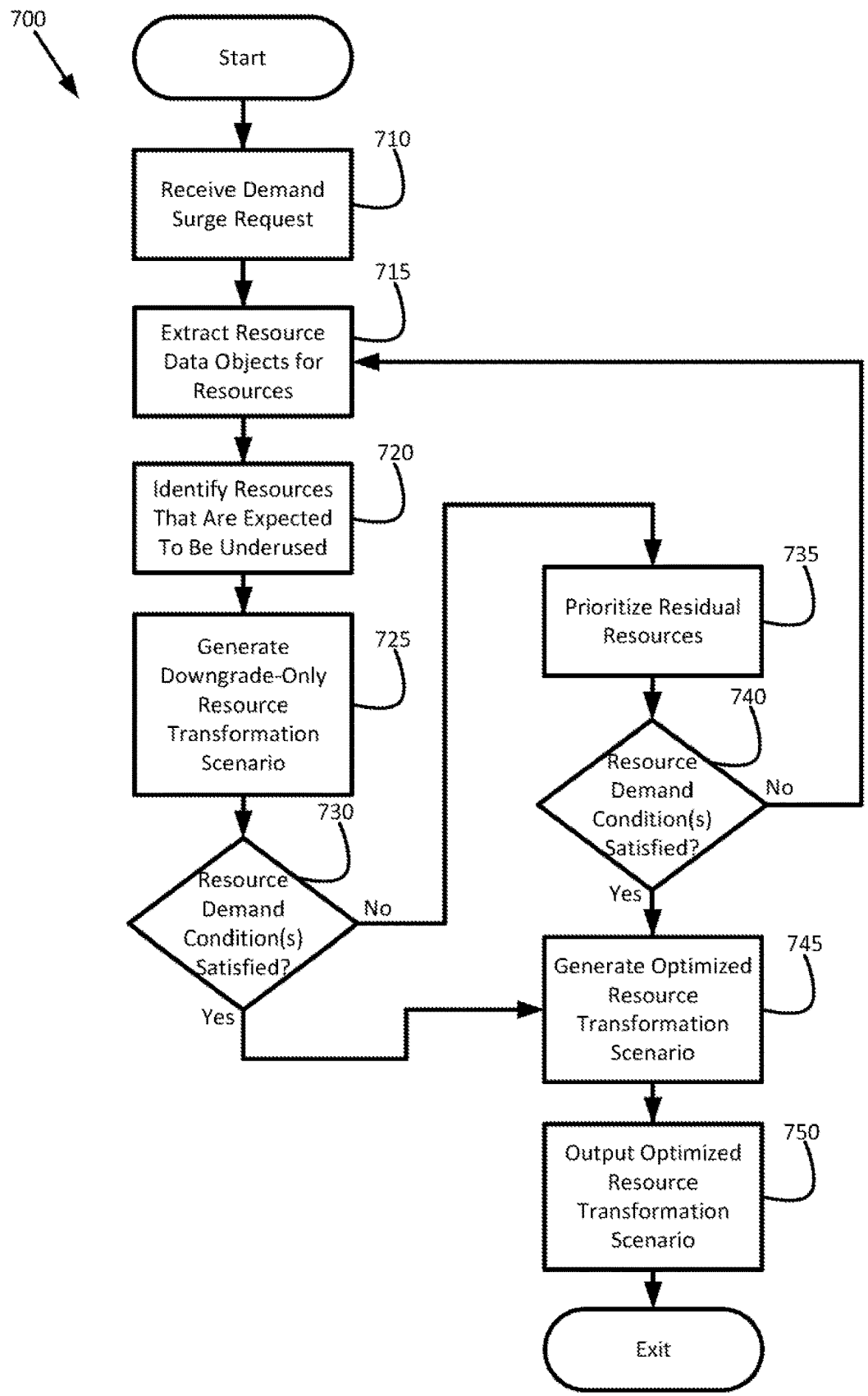
FIG. 7 is a process flow for dynamically allocating resources to satisfy one or more resource demand conditions in accordance with various embodiments of the present disclosure.

Therefore, turning now to FIG. 7, additional details are provided regarding a process flow for generating a optimized resource transformation scenario for a demand surge scenario according to various embodiments. FIG. 7 is a flow diagram showing a dynamic allocation module for performing such functionality according to various embodiments of the disclosure. For example, the flow diagram shown in FIG. 7 may correspond to operations carried out by a processing element 210 in a computing entity 200, such as an application server 110 described in FIG. 1, as it executes the dynamic allocation module stored in the computing entity's volatile and/or nonvolatile memory.

The process flow 700 begins with the dynamic allocation module receiving a demand surge request for a demand surge scenario in Operation 710. Here, in particular embodiments, the demand surge request may identify the type and/or amount of resources need to satisfy the one or more resource demand conditions resulting from the demand surge scenario, as well as the time period over which the demand surge scenario is expected to occur. In turn, the dynamic allocation module extracts resource transformation data objects from the resource repository for resources that can be used to satisfy the one or more resource demand conditions in Operation 715.

Accordingly, in some embodiments, the extracted resource transformation data objects include objects representing resources that can be used to satisfy the one or more resource demand conditions with and without having to be transformed. For example, each of the resource transformation data objects may be one or more data entries found in the resource repository for resources that can be used to satisfy the one or more resource demand conditions such as one or more data entries found in the Facility Resources structure 310, Resource Demand Conditions structure 320, and/or Resource to Resource Demand Condition structure 340 found in the data architecture 300 shown in FIG. 3.

Here, in particular embodiments, the dynamic allocation module may be configured to extract the resource transformation data objects for those resources that can be transformed within the time period in which the demand surge scenario is expected to occur. In addition, in some embodiments, the dynamic allocation module may be configured to use other criteria in extracting the resource transformation data objects for the resources such as, for example, the cost associated with transforming the resources to be used to satisfy the one or more resource demand conditions. Those of ordinary skill in the art can envision other criteria that may be used in light of this disclosure.

The dynamic allocation module then identifies those resources represented by the extracted resourced data objects that are expected to be underutilized during the demand surge scenario in Operation 720. Here, being "underutilized" indicates the resources are not expected to be used to their full potential to satisfy other demand resource conditions during the time period the demand surge scenario is expected occur. Depending on the embodiment, the dynamic allocation module may be configured to consider one or more conditions and/or parameters in evaluating whether a resource is expected to be used or not to the resource's full potential during the demand surge scenario.

For instance, the dynamic allocation module may evaluate the current use for the resource in identifying whether the resource is expected to be used or not to the resource's full potential during the demand surge scenario. For example, the resource may be a nurse who is currently assigned to a maternity ward in a hospital. In this example, the demand surge scenario may involve an epidemic that is expected to result in a significant increase in the number of patients requiring care in the ICU unit at the hospital. The nurse may be scheduled to work fulltime in the maternity ward during the time period in which the epidemic is expected to occur. However, although the nurse may not have any additional capacity to work in the ICU unit since he is scheduled to work fulltime in the maternity ward, the nurse may still be considered to be underutilized during the time period that the epidemic is expected to occur since the need for staff to work in the ICU unit is considered a higher priority than staff to work the maternity ward. Therefore, the dynamic allocation module may recognize the nurse as a resource that is expected to be underutilized during the time period the epidemic is expected to occur. Those of ordinary skill in the art can recognize other conditions and/or parameters that may be considered by the dynamic allocation module in identifying those resources that are expected to be underutilized during the time period the demand surge scenario is expected to occur in light of this disclosure.

Once the dynamic allocation module identifies those resources that are expected to be underutilized during the demand surge scenario, the dynamic allocation module generates a downgrade-only resource transformation scenario in Operation 725. Accordingly, in various embodiments, the downgrade-only resource transformation scenario may identify resource transformation data objects for those underutilized resources that involve a downgrade transformation to be used to satisfy the one or more resource demand conditions. Here, in particular embodiments, the dynamic allocation module may be configured to evaluate the resources based at least in part on one or more conditions and/or parameters to identify the downgrade set of resources.

For example, a resource may be considered as a downgrade resource if the cost associated with transforming the resource so that the resource may be used to satisfy the one or more resource demand conditions is zero or satisfies a cost threshold. For instance, if the cost to transform the resource is below a threshold amount. Other conditions and/or parameters may be considered in identifying a downgrade resource such as time required for transformation, opportunity cost associated with transforming the resources, and/or the like. Opportunity cost may be the cost associated with diverting the resource to be used to satisfy the one or more resource demand conditions resulting from the demand surge scenario from being used to satisfy one or more other resource demand conditions.

At this point, the dynamic allocation module determines whether the resources associated with the resource transformation data objects identified in the downgrade-only resource transformation scenario satisfy the one or more resource demand conditions in Operation 730. If so, then the dynamic allocation module generates the optimized resource transformation scenario based at least in part on the downgrade-only resource transformation scenario in Operation 745.

However, if the resources associated with the resource transformation data objects identified in the downgrade-only resource transformation scenario do not satisfy the one or more resource demand conditions, then the dynamic allocation module prioritizes the residual resources that are not part of the resources represented by the downgrade-only resource transformation scenario in Operation 735. Accordingly, in various embodiments, the dynamic allocation module performs this particular operation by processing the resource transformation data objects for the residual resources using a resource optimization machine learning model.

In various embodiments, the resource optimization machine learning model is configured for optimizing the use of the residual resources requiring an upgrade transformation to address the one or more resource demand conditions. For instance, in some embodiments, the resource optimization machine learning model is a supervised or an unsupervised machine learning model that is characterized by a set of resource optimization parameters to generate one or more resource priority scores for the residual resources. In other embodiments, the resource optimization machine learning model is a rule-based model that is characterized by a set of resource optimization parameters to generate one or more resource priority scores for the residual resources.

Depending on the embodiment, the set of resource optimization parameters may involve, for example, a cost of transforming the resource to address the one or more resource demand conditions, a time required to transform the resource to address the one or more resource demand conditions, an opportunity cost associated with transforming the resource to address the one or more resource demand conditions, and/or the like. Thus, the resource priority score for a residual resource may represent a priority for using the resource to address the one or more resource demand conditions with respect to the other residual resources. Accordingly, in particular embodiments, the dynamic allocation module may then generate a hybrid resource transformation scenario based at least in part on the one or more resource priority scores for the residual resources and the downgrade-only resource transformation scenario. Here, the hybrid resource transformation scenario may identify a listing of the resource transformation data objects for the resources base on a priority associated with using each resource in satisfying the one or more resource demand conditions.

At this point, the dynamic allocation module determines whether the resources associated with the resource transformation data objects identified in the hybrid resource transformation scenario satisfy the one or more resource demand conditions in Operation 740. If not, then the dynamic allocation module returns to Operation 715 and extracts resource transformation data objects for additional resources that can then be used to satisfy the one or more resource demand conditions. Depending on the embodiment, the dynamic allocation module may be configured to use some type of criteria in extracting the resource transformation data objects for these additional resources. For example, the dynamic allocation module may be configured in some embodiments to use a cost and/or time threshold associated with transforming these additional resources to satisfy the one or more resource demand conditions. Those of ordinary skill in the art can envision various criteria that may be used in identifying the additional resources in light of this disclosure.

However, if the resources associated with the resource transformation data objects identified in the hybrid resource transformation scenario satisfy the one or more resource demand conditions, then the dynamic allocation module generates the optimized resource transformation scenario in Operation 745 and outputs the scenario in Operation 750. Accordingly, in various embodiments, the optimized resource transformation scenario may then be used in performing one or more resource transformation actions that involve transforming the resources associated with the resource transformation data objects identified in the scenario so that the resources may then be used to satisfy the one or more resource demand conditions for the demand surge scenario. For example, the optimized resource transformation scenario may involve a data object such as a report that include information that can be used in performing the one or more transformations actions such as type of transformation needed for the resource (e.g., downgrade or upgrade), the cost of transformation, time needed for transformation, the priority for transforming the resource, the resource demand condition(s) satisfied by resource, and/or the like.

In addition, the optimized resource transformation scenario may be configured in various embodiments so that the scenario may be used in performing automated and/or manual transformation actions. For example, the optimized resource transformation scenario may be configured so that one or more automated processes can use the scenario as input in generating instructions for transforming the resources. While in other instances, the optimized resource transformation scenario may be used in a decision support role providing recommendations to personnel such as facility administrator(s) who make decisions in resource allocation to address the demand surge scenario. Thus, the optimized resource transformation scenario may ensure resources can be transformed to satisfy the one or more resource demand conditions resulting from the demand surge scenario with the lowest time and/or cost (e.g., according to an optimized solution). In some embodiments, the dynamic allocation module may be configured to present user interface data for a prediction output user interface that describes the optimized resource transformation scenario and transmit the user interface data to a client computing entity, where the client computing entity may be configured to present the prediction output user interface based at least in part on the user interface data. An operational example of a prediction output user interface 1100 is depicted in FIG. 11.

Resource Rollback Module

Figure 8:
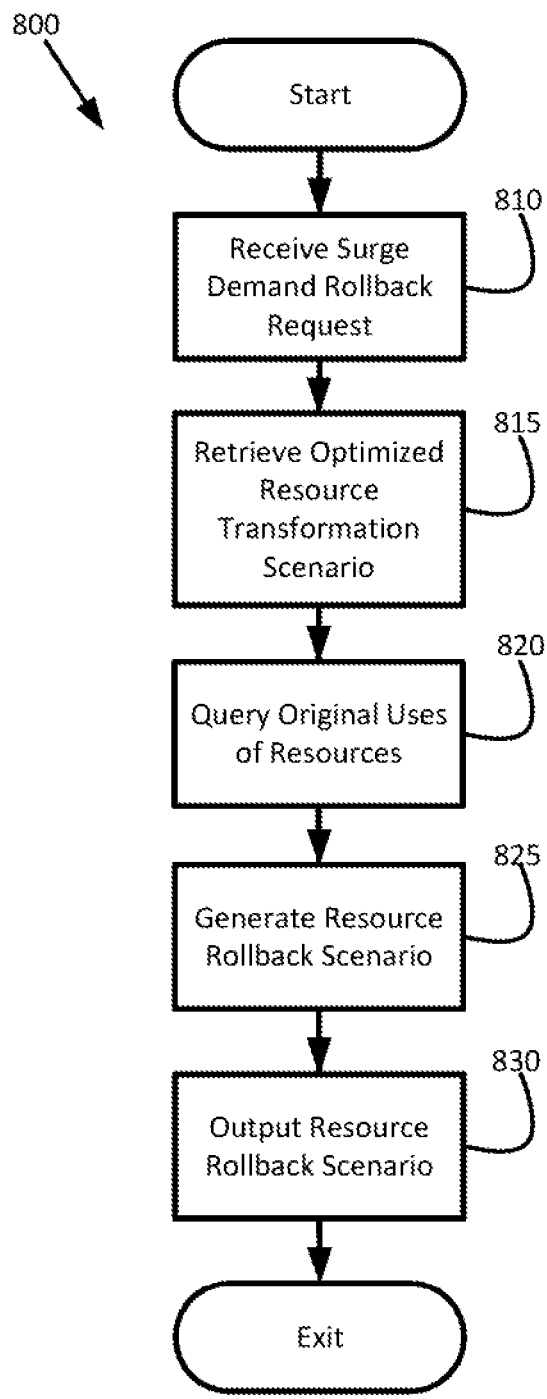
FIG. 8 is a process flow for rolling back resources allocated to satisfy one or more resource demand conditions in accordance with various embodiments of the present disclosure.

As previously noted, a rollback of resources that have been transformed to satisfy one or more resource demand conditions resulting from a demand surge scenario may be performed in various embodiments once the demand surge scenario is or has ended. Therefore, turning now to FIG. 8, additional details are provided regarding a process flow for rolling back one or more resources so that they may be returned to their original use according to various embodiments. FIG. 8 is a flow diagram showing a resource rollback module for performing such functionality according to various embodiments of the disclosure. For example, the flow diagram shown in FIG. 8 may correspond to operations carried out by a processing element 210 in a computing entity 200, such as an application server 110 described in FIG. 1, as it executes the resource rollback module stored in the computing entity's volatile and/or nonvolatile memory.

The process flow 800 begins with the resource rollback module receiving a surge demand rollback request for a particular demand surge scenario in Operation 810. In response, the resource rollback module retrieves the optimized resource transformation scenario for the demand surge scenario in Operation 815. Accordingly, the optimized resource transformation scenario identifies one or more resource transformation data objects associated with resources that may have been transformed to satisfy one or more resource demand conditions that resulted from the demand surge scenario. Therefore, the resource rollback module may use the optimized resource transformation scenario in generating a plan for rolling back such resources so that they may be used for their original purposes.

Thus, in various embodiments, the resource rollback module queries the original uses of the resources in Operation 820. Here, in particular embodiments, the resource rollback module may query information on the original uses from the resource repository. Once queried, the resource rollback module then generates a resource rollback scenario and outputs the scenario in Operations 825 and 830. Accordingly, the resource rollback scenario may be used in various embodiments in a similar manner as the optimized resource transformation scenario. Therefore, the resource rollback scenario may be used in performing one or more rollback actions that involve transforming the resources associated with the resource transformation data objects identified in the resource rollback scenario so that the resources may again be used to satisfy one or more resource demand conditions as originally intended.

CONCLUSION

Many modifications and other embodiments of the disclosure set forth herein will come to mind to one skilled in the art to which these modifications and other embodiments pertain having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method comprising:
identifying, by one or more processors, a demand surge scenario, wherein the demand surge scenario is associated with a resource demand condition;
determining, by the one or more processors and based at least in part on resource transformation data associated with a plurality of resources, a downgrade set of the plurality of resources;
responsive to determining, by the one or more processors, that a downgrade-only resource transformation scenario fails to satisfy the resource demand condition:
(i) identifying, by the one or more processors, a residual resource of the plurality of resources that is (1) transformable to satisfy the resource demand condition and (2) not in the downgrade set;
(ii) generating, by the one or more processors, a resource priority score for the residual resource;
(iii) identifying, by the one or more processors, a hybrid resource transformation scenario based at least in part on the resource priority score and the downgrade-only resource transformation scenario; and
(iv) identifying, by the one or more processors, an optimized resource transformation scenario based at least in part on the hybrid resource transformation scenario;
generating, by the one or more processors, a recommendation for one or more resource transformation actions to be performed based at least in part on the optimized resource transformation scenario; and
providing, by the one or more processors, an interface to a client computing entity, wherein the interface comprises the recommendation for the one or more resource transformation actions to be performed.

2. The computer-implemented method of claim 1, wherein identifying the demand surge scenario comprises:
(i) identifying a first demand surge scenario associated with one or more first resource demand conditions;
(ii) identifying a second demand surge scenario associated with one or more second resource demand conditions;
(iii) determining the resource demand condition based at least in part on the one or more first resource demand conditions and the one or more second resource demand conditions; and
(iv) identifying the demand surge scenario based at least in part on the resource demand condition.

3. The computer-implemented method of claim 2, wherein determining the resource demand condition comprises merging the one or more first resource demand conditions and the one or more second resource demand conditions.

4. The computer-implemented method of claim 2, wherein determining the resource demand condition is further based at least in part on a shared subset of the one or more first resource demand conditions and the one or more second resource demand conditions.

5. The computer-implemented method of claim 2, wherein determining the resource demand condition comprises:
determining a first demand surge priority score for the first demand surge scenario;
determining a second demand surge priority score for the second demand surge scenario; and
responsive to determining that the first demand surge priority score exceeds the second demand surge priority score, determining the resource demand condition based at least in part on the one or more first resource demand conditions.

6. The computer-implemented method of claim 1, wherein the resource transformation data comprises data that is associated with (a) the plurality of resources in the downgrade set or (b) the residual resource that is transformable to satisfy the resource demand condition within an expected time occurrence for the demand surge scenario.

7. The computer-implemented method of claim 1, wherein the plurality of resources in the downgrade set are transformable to satisfy the resource demand condition for no cost or a cost satisfying a threshold cost.

8. The computer-implemented method of claim 1, wherein the resource transformation data comprises a set of resource optimization parameters comprising at least one of a transformation cost parameter or a transformation time parameter.

9. The computer-implemented method of claim 1, wherein the one or more resource transformation actions comprise executing an operation on the residual resource to satisfy the resource demand condition.

10. The computer-implemented method of claim 1, wherein the demand surge scenario is an event that results in a markedly increase in a need for the residual resource.

11. The computer-implemented method of claim 1, wherein the resource priority score for the residual resource represents a priority for using the residual resource to address the resource demand condition with respect to other resources of the plurality of resources.

12. A system comprising memory and one or more processors communicably coupled to the memory, the one or more processors configured to:
identify a demand surge scenario, wherein the demand surge scenario is associated with a resource demand condition;
determine, based at least in part on resource transformation data associated with a plurality of resources, a downgrade set of the plurality of resources;
responsive to determining that a downgrade-only resource transformation scenario fails to satisfy the resource demand condition:
  (i) identify a residual resource of the plurality of resources that is (1) transformable to satisfy the resource demand condition and (2) not in the downgrade set;
  (ii) generate a resource priority score for the residual resource;
  (iii) identify a hybrid resource transformation scenario based at least in part on the resource priority score and the downgrade-only resource transformation scenario; and
  (iv) identify an optimized resource transformation scenario based at least in part on the hybrid resource transformation scenario;
generate a recommendation for one or more resource transformation actions to be performed based at least in part on the optimized resource transformation scenario; and
provide an interface to a client computing entity, wherein the interface comprises the recommendation for the one or more resource transformation actions to be performed.

13. The system of claim 12, wherein the memory is further configured to, with the one or more processors, cause the system to identify the demand surge scenario by:
  (i) identifying a first demand surge scenario associated with one or more first resource demand conditions;
  (ii) identifying a second demand surge scenario associated with one or more second resource demand conditions;
  (iii) determining the resource demand condition based at least in part on the one or more first resource demand conditions and the one or more second resource demand conditions; and
  (iv) identifying the demand surge scenario based at least in part on the resource demand condition.

14. The system of claim 13, wherein determining the resource demand condition comprises merging the one or more first resource demand conditions and the one or more second resource demand conditions.

15. The system of claim 13, wherein determining the resource demand condition is further based at least in part on a shared subset of the one or more first resource demand conditions and the one or more second resource demand conditions.

16. The system of claim 13, wherein determining the resource demand condition comprises:
determining a first demand surge priority score for the first demand surge scenario;
determining a second demand surge priority score for the second demand surge scenario; and
determining the resource demand condition based at least in part on the one or more first resource demand conditions when the first demand surge priority score exceeds the second demand surge priority score.

17. The system of claim 16, wherein determining the resource demand condition further comprises:
determining the resource demand condition based at least in part on the one or more second resource demand conditions when the second demand surge priority score exceeds the first demand surge priority score.

18. The system of claim 12, wherein the resource transformation data comprises data that is associated with (a) the plurality of resources in the downgrade set or (b) the residual resource that is transformable to satisfy the resource demand condition within an expected time occurrence for the demand surge scenario.

19. The system of claim 12, wherein the resource transformation data comprises a set of resource optimization parameters comprising at least one of a transformation cost parameter or a transformation time parameter.

20. At least one non-transitory computer storage media including instructions that, when executed by one or more processors, cause the one or more processors to:
identify a demand surge scenario, wherein the demand surge scenario is associated with a resource demand condition;
determine, based at least in part on resource transformation data associated with a plurality of resources, a downgrade set of the plurality of resources;
responsive to determining that a downgrade-only resource transformation scenario fails to satisfy the resource demand condition:
  (i) identify a residual resource of the plurality of resources that is (1) transformable to satisfy the resource demand condition and (2) not in the downgrade set;
  (ii) generate a resource priority score for the residual resource;
  (iii) identify a hybrid resource transformation scenario based at least in part on the resource priority score and the downgrade-only resource transformation scenario; and
  (iv) identify an optimized resource transformation scenario based at least in part on the hybrid resource transformation scenario;
generate a recommendation for one or more resource transformation actions to be performed based at least in part on the optimized resource transformation scenario; and
provide an interface to a client computing entity, wherein the interface comprises the recommendation for the one or more resource transformation actions to be performed.

* * * * *